US012580359B2

(12) United States Patent
Bennett et al.

(10) Patent No.: US 12,580,359 B2
(45) Date of Patent: Mar. 17, 2026

(54) AMPLIFYING OPTICAL FIBERS

(71) Applicant: CORNING INCORPORATED,
Corning, NY (US)

(72) Inventors: Kevin Wallace Bennett,
Hammondsport, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 559 days.

(21) Appl. No.: 18/127,399

(22) Filed: Mar. 28, 2023

(65) Prior Publication Data

US 2023/0335966 A1      Oct. 19, 2023

Related U.S. Application Data

(60) Provisional application No. 63/331,973, filed on Apr. 18, 2022.

(51) Int. Cl.
*H01S 3/067* (2006.01)
(52) U.S. Cl.
CPC ...... *H01S 3/06733* (2013.01); *H01S 3/06716* (2013.01)
(58) Field of Classification Search
CPC ............. H01S 3/06733; H01S 3/06737; H01S 3/094007; H01S 3/06716; G02B 6/02395
See application file for complete search history.

(56) References Cited

U.S. PATENT DOCUMENTS 7,466,479 B2    12/2008  Aiso
2012/0148206 A1*   6/2012  Boivin ................ H01S 3/06716
977/932
(Continued)

FOREIGN PATENT DOCUMENTS

CN          110289539 A      9/2019
CN          113589422 A      11/2021
(Continued)

OTHER PUBLICATIONS

Chen Haoshuo et al., "Integrated Optical Fiber Amplifiers For Space-Division Multiplexed Systems", Proceedings of SPIE, vol. 10130, Jan. 28, 2017, pp. 1013005-1013005.
(Continued)

*Primary Examiner* — Dennis P Joseph
(74) *Attorney, Agent, or Firm* — Kevin L. Bray

(57)        ABSTRACT
An amplifying optical fiber includes a common cladding comprising a radius defining a glass portion of the amplifying optical fiber and having a relative refractive index $\Delta_4$. At least one waveguide extends through the common cladding The at least one waveguide includes a core region, an inner cladding region encircling and directly contacting the core region, and a depressed cladding region encircling and directly contacting the inner cladding region. The core region includes from greater than or equal to about 500 ppm and less than or equal to about 10,000 ppm $Er_2O_3$ and has core maximum relative refractive index $\Delta_{1max}$. The inner cladding region includes an inner cladding relative refractive index $\Delta_2$. The depressed cladding region includes a minimum depressed relative refractive index $\Delta_{3min}$ such that $\Delta_{1max} > \Delta_2 > \Delta_{3min}$ and $\Delta_4 > \Delta_{3min}$.

18 Claims, 7 Drawing Sheets

(56)                     References Cited

U.S. PATENT DOCUMENTS

| | | | |
|---|---|---|---|
| 2012/0224254 A1* | 9/2012 | Burov | C03B 37/01869 |
| | | | 359/341.5 |
| 2013/0182314 A1 | 7/2013 | Bennett et al. | |
| 2016/0164609 A1* | 6/2016 | Hill | H01S 3/06766 |
| | | | 398/121 |
| 2018/0301864 A1 | 10/2018 | Yaman et al. | |
| 2019/0115715 A1 | 4/2019 | Hasegawa et al. | |
| 2021/0242652 A1* | 8/2021 | Proulx | H01S 3/06733 |
| 2022/0026627 A1* | 1/2022 | Bickham | G02B 6/02014 |
| 2023/0123319 A1* | 4/2023 | Takasaka | H01S 3/06737 |
| | | | 359/341.3 |

FOREIGN PATENT DOCUMENTS

| | | |
|---|---|---|
| EP | 2495589 A1 | 9/2012 |
| WO | 2013/090549 A2 | 6/2013 |
| WO | 2022/039073 A1 | 2/2022 |

OTHER PUBLICATIONS

Larochelle Sophie et al., "Cladding Pumped Multi-Core Fiber Amplifiers for Space Division Multiplexing", 2018 IEEE Canadian Conference On Electrical & Computer Engineering (CCECE), IEEE, May 13, 2018, pp. 1-5.

Takenaga K. et al., "Reduction of Crosstalk by Trench-Assisted Multi-Core Fiber", Optical Fiber Communication Conference/National Fiber Optic Engineers Conference 2011, Jan. 2011, 3 pages.

Anping Liu and Kenichi Ueda "Propagation losses of pump light in rectangular double-clad fibers", Optical Engineering, vol. 35 No. 11, Nov. 1996, 5 pages.

Jain et al; "32-CORE Erbium/Ytterbium-Doped Multicore Fiber Amplifier for Next Generation Space-Division Multiplexed Transmission System"; Optics Express, vol. 25, No. 26; Dec. 2017, 10 Pages.

M. Li, et al., "Coupled Mode Analysis of Crosstalk in Dual-core fiber with Random Perturbations," in Optical Fiber Communication Conference, OSA Technical Digest (online), Optical Society of America, 2015, paper W2A.35, 3 pages.

T. Hayashi et al., "Physical interpretation of intercore crosstalk in multicore fiber: Effects of macrobend, structure fluctuation, and microbend," Opt. Exp., vol. 21, No. 5, Mar. 2013, pp. 5401-5412.

Tu et al., "Design and analysis of large-effective-area heterogeneous trench-assisted multi-core fiber", Optics Express, 15157, 20 2012, 14 pages.

Ye et al., "Simple analytical expression for crosstalk estimation in homogeneous trench-assisted multi-core fibers", Optics Express 23007 22 (19), 2014, 12 pages.

* cited by examiner

AMPLIFYING OPTICAL FIBERS

This Application claims the benefit of priority to U.S. Provisional Patent Application Ser. No. 63/331,973 filed on Apr. 18, 2022, the content of which is relied upon and incorporated herein by reference in its entirety.

BACKGROUND

Field

The present specification generally relates to optical fibers and, more particularly, to trench-assisted amplifying optical fibers with waveguides doped with rare-earth elements.

Technical Background

Recently there has been a dramatic increase in internet traffic over submarine (undersea) optical fiber cables, with greater than 90% of inter-continental communications transmitted over submarine cables. This increase in internet traffic is driven not only by the traffic generated by communications between humans and machines, but also by machine-to-machine traffic that now is surpassing human generated traffic.

The traditional approach to meeting this increased demand in submarine communication systems has been to increase the capacity per fiber pair. However, with newer modulation formats, the capacity per fiber is approaching the Shannon limit and power to the network is limited by power feeding equipment. As a result, other methods for increasing the capacity of the optical fibers are being explored.

One alternative entails the use of Space Division Multiplexing (SDM) for increasing the capacity and reach of submarine optical fiber cables. The developmental focus of SDM technology is to shift the emphasis from the traditional approach of increasing the capacity per fiber pair to increasing the capacity per cable. SDM allows maximization of the capacity per cable by increasing the number of spatial channels and reducing repeater electrical power dissipation. SDM transmission also increases capacity linearly with power, compared to the logarithmic dependence of the traditional approach operating close to the Shannon limit. While increasing the number of fiber pairs has been the current method of choice for SDM technology, the method is unlikely to result in a capacity of >1 petabyte/sec with current submarine optical fiber cable design constraints.

For achieving a capacity in excess of 1 petabyte/sec, multi-core optical fibers are emerging as an attractive alternative for increasing capacity and improving power efficiency. However, an important limitation to the implementation of the multi-core optical fibers in submarine optical fiber cables is the ability to amplify the signal from each of the cores.

SUMMARY

In a first aspect A1, an amplifying optical fiber includes a common cladding comprising a radius defining a glass portion of the amplifying optical fiber and having a relative refractive index $\Delta_4$; and at least one waveguide extending through the common cladding, the at least one waveguide comprising a core region, an inner cladding region encircling and directly contacting the core region, and a depressed cladding region encircling and directly contacting the inner cladding region, wherein: the core region comprises from greater than or equal to about 500 ppm and less than or equal to about 10,000 ppm $Er_2O_3$ and a core maximum relative refractive index $\Delta_{1max}$; the inner cladding region comprises an inner cladding relative refractive index $\Delta_2$; the depressed cladding region comprises a minimum depressed relative refractive index $\Delta_{3min}$; and $\Delta_{1max} > \Delta_2 > \Delta_{3min}$ and $\Delta_4 >_{3min}$.

A second aspect A2 includes the amplifying optical fiber of claim 1, wherein the core region comprises greater than or equal to 8.0 wt. % and less than or equal to 36 wt. % $GeO_2$.

A third aspect A3 includes the amplifying optical fiber of any of aspects A1-A2, wherein the core region comprises greater than or equal to 1 wt. % and less than or equal to 20 wt. % $Al_2O_3$.

A fourth aspect A4 includes the amplifying optical fiber of any of aspects A1-A3, wherein the $Er_2O_3$ is uniformly distributed in the core region.

A fifth aspect A5 includes the amplifying optical fiber of any of aspects A1-A4, wherein the $Er_2O_3$ has a graded distribution in the core region such that the $Er_2O_3$ is a maximum at or near a longitudinal centerline of the core region and decreases with increasing distance from the longitudinal centerline of the core region.

A sixth aspect A6 includes the amplifying optical fiber of aspect A5, wherein: the core region comprises greater than or equal to 1 wt. % and less than or equal to 20 wt. % $Al_2O_3$; and the $Al_2O_3$ has a graded distribution in the core region such that the $Al_2O_3$ is a maximum at or near the longitudinal centerline of the core region and decreases with increasing distance from the longitudinal centerline of the core region.

A seventh aspect A7 includes the amplifying optical fiber of aspect A4, wherein: the core region comprises greater than or equal to 1 wt. % and less than or equal to 20 wt. % $Al_2O_3$; and the $Al_2O_3$ has a uniform distribution in the core region.

An eighth aspect A8 includes the amplifying optical fiber of any of aspects A1-A7, wherein the depressed cladding region has a trench volume $V_T$ greater than or equal to 10% $\mu m^2$ and less than or equal to 60% $\mu m^2$.

A ninth aspect A9 includes the amplifying optical fiber of any of aspects A1-A8, wherein the depressed cladding region comprises a maximum fluorine concentration of greater than or equal to 0.5 wt. % and less than or equal to 2.5 wt. %.

A tenth aspect A10 includes the amplifying optical fiber of any of aspects A1-A9, wherein a depressed relative refractive index $\Delta_3(r)$ of the depressed cladding region decreases with increasing radial distance from a longitudinal centerline of the at least one waveguide to the minimum depressed relative refractive index $\Delta_{3min}$.

An eleventh aspect A11 includes the amplifying optical fiber of any of aspects A1-A10, wherein a peak power conversion efficiency of the at least one waveguide is greater than or equal to 50%.

A twelfth aspect A12 includes the amplifying optical fiber of any of aspects A1-A11, wherein a numerical aperture of the at least one waveguide is greater than or equal to 0.15 and less than or equal to 0.3.

A thirteenth aspect A13 includes the amplifying optical fiber of any of aspects A1-A12, wherein a Mode Field Diameter of the at least one waveguide is greater than or equal to 5 $\mu m$ and less than or equal to 8 $\mu m$ at a wavelength of 1550 nm.

A fourteenth aspect A14 includes the amplifying optical fiber of any of aspects A1-A13, wherein a cable cutoff wavelength of the at least one waveguide is less than or equal to 1500 nm.

A fifteenth aspect A15 includes the amplifying optical fiber of any of aspects A1-A14, wherein the at least one waveguide is a plurality of waveguides.

A sixteenth aspect A16 includes the amplifying optical fiber of any of aspects A1-A5, wherein the plurality of waveguides comprises greater than or equal to four waveguides.

A seventeenth aspect A17 includes the amplifying optical fiber of any of aspects A1-A15, wherein the plurality of waveguides comprises greater than or equal to six waveguides.

An eighteenth aspect A18 includes the amplifying optical fiber of any of aspects A1-A15, wherein an inter-waveguide crosstalk between each waveguide of the plurality of waveguides and a nearest neighbor of each waveguide is less than or equal to −30 dB as measured for a 50 m length of the amplifying optical fiber with a bend radius of less than or equal to 70 mm operating at a wavelength of 1550 nm.

A nineteenth aspect A19 includes the amplifying optical fiber of any of aspects A1-A15, wherein a waveguide-to-waveguide spacing between each waveguide of the plurality of waveguides and a nearest neighbor of each waveguide is greater than or equal to 25 μm.

In a twentieth aspect A20 an amplifying optical fiber includes: a common cladding comprising a radius defining a glass portion of the amplifying optical fiber and having a relative refractive index $\Delta_4$; and a plurality of waveguides extending through the common cladding, each waveguide of the plurality of waveguides comprising a core region, an inner cladding region encircling and directly contacting the core region, and a depressed cladding region encircling and directly contacting the inner cladding region, wherein: the core region of each waveguide comprises from greater than or equal to about 500 ppm and less than or equal to about 10,000 ppm $Er_2O_3$ and a core maximum relative refractive index $\Delta_{1max}$; the inner cladding region of each waveguide comprises an inner cladding relative refractive index $\Delta_2$; the depressed cladding region of each waveguide comprises a minimum depressed relative refractive index $\Delta_{3min}$ and a trench volume $V_T$ greater than or equal to 10% μm$^2$ and less than or equal to 60% μm$^2$; $\Delta_{1max}>\Delta_2>\Delta_{3min}$ and $\Delta_4>\Delta_{3min}$; and an inter-waveguide crosstalk between each waveguide of the plurality of waveguides and a nearest neighbor of each waveguide is less than or equal to −30 dB as measured for a 50 m length of the amplifying optical fiber comprising a bend radius of less than or equal to 70 mm operating at a wavelength of 1550 nm.

A twenty-first aspect A21 includes the amplifying optical fiber of aspect A20, wherein the core region of each waveguide comprises greater than or equal to 6.0 wt. % and less than or equal to 22 wt. % $GeO_2$.

A twenty-second aspect A22 includes the amplifying optical fiber of any of aspects A20-A21, wherein the core region of each waveguide comprises greater than or equal to 1 wt. % and less than or equal to 20 wt. % $Al_2O_3$.

A twenty-third aspect A23 includes the amplifying optical fiber of any of aspects A20-A22, wherein the $Er_2O_3$ is uniformly distributed in the core region of each waveguide.

A twenty-fourth aspect A24 includes the amplifying optical fiber of any of aspects A20-A23, wherein the $Er_2O_3$ has a graded distribution in the core region of each waveguide such that the $Er_2O_3$ is a maximum at or near a longitudinal centerline of the core region of each waveguide and decreases with increasing distance from the longitudinal centerline of the core region of each waveguide.

A twenty-fifth aspect A25 includes the amplifying optical fiber of any of aspects A20-A24, wherein: the core region of each waveguide comprises greater than or equal to 1 wt. % and less than or equal to 20 wt. % $Al_2O_3$; and the $Al_2O_3$ has a graded distribution in the core region of each waveguide such that the $Al_2O_3$ is a maximum at or near the longitudinal centerline of the core region of each waveguide and decreases with increasing distance from the longitudinal centerline of the core region of each waveguide.

A twenty-sixth aspect A26 includes the amplifying optical fiber of any of aspects A20-A25, wherein: the core region of each waveguide comprises greater than or equal to 1 wt. % and less than or equal to 20 wt. % $Al_2O_3$; and the $Al_2O_3$ has a uniform distribution in the core region each waveguide.

A twenty-seventh aspect A27 includes the amplifying optical fiber of any of aspects A20-A26, wherein the depressed cladding region of each waveguide comprises a maximum fluorine concentration of greater than or equal to 0.5 wt. % and less than or equal to 2.5 wt. %.

A twenty-eighth aspect A28 includes the amplifying optical fiber of any of aspects A20-A27, wherein a depressed relative refractive index $\Delta_3(r)$ of the depressed cladding region of each waveguide decreases with increasing radial distance from a longitudinal centerline of each waveguide to the minimum depressed relative refractive index $\Delta_{3min}$.

A twenty-ninth aspect A29 includes the amplifying optical fiber of any of aspects A20-A28, wherein a peak power conversion efficiency of each waveguide is greater than or equal to 50%.

A thirtieth aspect A30 includes the amplifying optical fiber of any of aspects A20-A29, wherein a numerical aperture of each waveguide is greater than or equal to 0.15 and less than or equal to 0.3.

A thirty-first aspect A31 includes the amplifying optical fiber of any of aspects A20-A30, wherein a Mode Field Diameter of each waveguide is greater than or equal to 5 μm and less than or equal to 8 μm at a wavelength of 1550 nm.

A thirty-second aspect A32 includes the amplifying optical fiber of any of aspects A20-A31, wherein a cable cutoff wavelength of each waveguide is less than or equal to 1500 nm.

A thirty-third aspect A33 includes the amplifying optical fiber of any of aspects A20-A32, wherein a waveguide-to-waveguide spacing between each waveguide of the plurality of waveguides and a nearest neighbor of each waveguide is greater than or equal to 25 μm.

A thirty-fourth aspect A34 includes the amplifying optical fiber of any of aspects A20-A33, wherein each waveguide comprises the same relative refractive index profile.

A thirty-fifth aspect A35 includes the amplifying optical fiber of any of aspects A20-A34, wherein the plurality of waveguides comprises greater than or equal to two waveguides in the optical fiber.

A thirty-sixth aspect A36 includes the amplifying optical fiber of any of aspects A20-A35, wherein the plurality of waveguides comprises greater than or equal to four waveguides in the optical fiber.

Additional features and advantages of the amplifying optical fibers will be described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
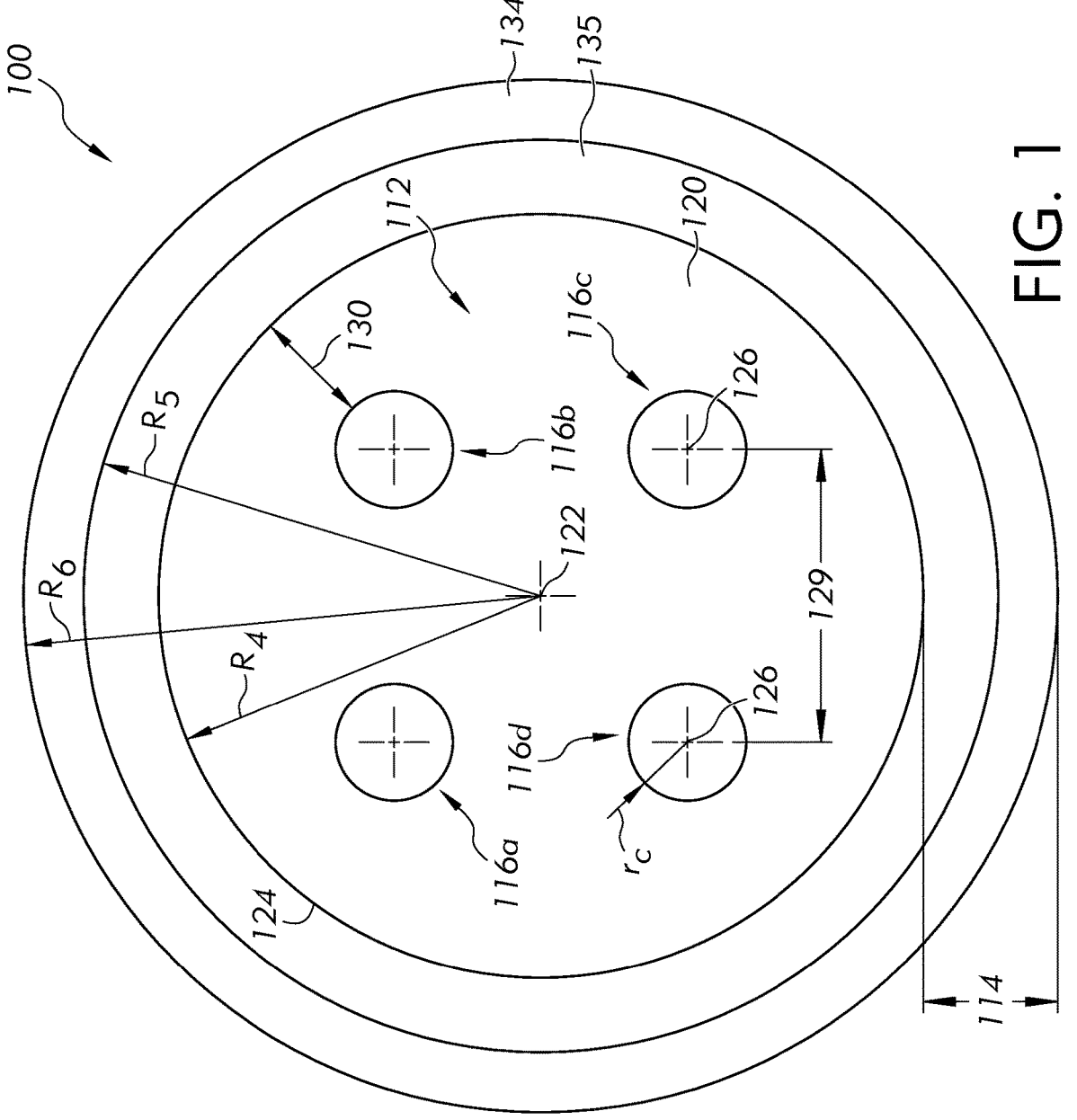
FIG. 1 schematically depicts a cross-sectional view of an amplifying optical fiber comprising at least one waveguide, specifically four waveguides, according to one or more embodiments shown and described herein.

Reference will now be made in detail to embodiments of amplifying optical fibers, examples of which are illustrated in the accompanying drawings. Whenever possible, the same reference numerals will be used throughout the drawings to refer to the same or like parts. One embodiment of an amplifying optical fiber is schematically depicted in FIG. 1 and is designated generally throughout by the reference numeral 100. The amplifying optical fiber generally comprises a common cladding comprising a radius defining a glass portion of the amplifying optical fiber and having a relative refractive index $\Delta_4$. At least one waveguide extends through the common cladding The at least one waveguide includes a core region, an inner cladding region encircling and directly contacting the core region, and a depressed cladding region encircling and directly contacting the inner cladding region. The core region includes from greater than or equal to about 500 ppm and less than or equal to about 10,000 ppm $Er_2O_3$ and has core maximum relative refractive index $\Delta_{1max}$. The inner cladding region includes an inner cladding relative refractive index $\Delta_2$. The depressed cladding region includes a minimum depressed relative refractive index $\Delta_{3min}$ such that $\Delta_{1max} > \Delta_2 > \Delta_{3min}$ and $\Delta_4 > \Delta_{3min}$. Various embodiments of amplifying optical fibers are described in further detail herein with specific reference to the appended drawings.

"Radial position" and "radial distance" when used in reference to the radial coordinate "r" refer to radial position relative to the centerline (r=0) of a core region of a waveguide of the amplifying optical fiber. "Radial position" and "radial distance" when used in reference to the radial coordinate "R" refer to radial position relative to the centerline (R=0) of the amplifying optical fiber.

As used herein, radial position $r_1$ and relative refractive index $\Delta_1$ or $\Delta_1(r)$ refer to a core region of a waveguide, radial position $r_2$ and relative refractive index $\Delta_2$ or $\Delta_2(r)$ refer to an inner cladding region of a waveguide, radial position $r_3$ and relative refractive index $\Delta_3$ or $\Delta_3(r)$ refer to a depressed cladding region of a waveguide, and radial position $R_4$ and relative refractive index $\Delta_4$ or $\Delta_4(R)$ refer to a common cladding. Radial positions $R_5$ and $R_6$ refer to inner and outer coatings, respectively, that circumferentially surround a common cladding. Each radial position $r_i(i=1, 2, 3)$ and $R_i(i=4, 5, 6)$ refers to the outer radius of the region associated with the value i. For example, $r_1$ refers to the outer radius of a core region of a waveguide; $r_2$ refers to the outer radius of an inner cladding region of a waveguide, etc.

The "relative refractive index" or "relative refractive index percent" as used herein with respect to amplifying optical fibers and the waveguides of amplifying optical fibers is defined according to equation (1):

$$\Delta\% = 100\frac{n^2(r) - n_c^2}{2n^2(r)} \tag{1}$$

where n(r) is the refractive index at the radial distance r from the waveguide's centerline (corresponding to r=0) and $n_c$ is the refractive index of the common cladding. The refractive indices are measured at a wavelength of 1550 nm, unless otherwise specified. In some embodiments, the common cladding comprises undoped silica glass and $n_c=1.444$. In some embodiments, the common cladding comprises silica doped with an up-dopant (e.g. chlorine), and $n_c>1.444$. If the common cladding is down-doped, such as when the common cladding comprises silica doped with a down-dopant (e.g. fluorine), $n_c<1.444$. As used herein, the relative refractive index is represented by Δ (or "delta") or Δ% (or "delta %") and its values are given in units of "%" or "%Δ", unless otherwise specified. Relative refractive index may also be expressed as Δ(r) or Δ(r)%. When the refractive index of a region is less than the reference index $n_c$, the relative refractive index is negative and can be referred to as a trench or depressed region. When the refractive index of a region is greater than the reference index $n_c$, the relative refractive index is positive and the region can be said to be raised or a positive relative refractive index.

The "refractive index profile" is the relationship between refractive index or relative refractive index and radial distance r from the waveguide's centerline for each waveguide of the amplifying optical fiber. For relative refractive index profiles depicted herein as having relatively sharp boundaries between various regions, normal variations in processing conditions appreciated in the art may result in step boundaries at the interface of adjacent regions that are not sharp. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (within a core region and/or any of the cladding regions of the waveguide and/or common cladding), it may be expressed in terms of its actual or approximate functional dependence or in terms of an average value applicable to the region. Unless otherwise specified, if the relative refractive index of a region (core region and/or any of the inner, outer and/or common cladding regions) is expressed as a single value, it is understood that the relative refractive index in the region is constant, or approximately constant, and corresponds to the single value or that the single value represents an average value of a non-constant relative refractive index dependence with radial position in the region. Whether by design or as a consequence of normal manufacturing variability, the dependence of relative refractive index on radial position may be sloped, curved, or otherwise non-constant.

The term "$\alpha$-profile" (also referred to as an "alpha profile") refers to a relative refractive index profile $\Delta(r)$ of the core region that has the following functional form (2):

$$\Delta(r) = \Delta(r_0)\left\{1 - \left[\frac{|r - r_0|}{(r_1 - r_0)}\right]^{\alpha}\right\} \quad (2)$$

where $r_0$ is the point at which $\Delta(r)$ is maximum, $r_1$ is the point at which $\Delta(r)$ is zero (disposed radially outward of $r_0$), and r is in the range $r_i \leq r \leq r_f$, where $r_i$ is the initial point of the $\alpha$-profile, $r_f$ is the final point of the $\alpha$-profile, and $\alpha$ is a real number, referred to herein as an "alpha value." In some embodiments, examples shown herein can have a core region with an alpha profile having an alpha value of $1 \leq \alpha \leq 100$. In practice, in an actual optical fiber, even when the target profile is an alpha profile, some level of deviation from the ideal configuration can occur. Therefore, the alpha value for an optical fiber may be obtained from a best fit of the measured index profile, as is known in the art.

The term "graded-index profile" refers to an alpha profile, where $\alpha < 10$. The term "step-index profile" refers to an alpha profile, where $\alpha \geq 10$.

The cutoff wavelength of an optical fiber is the minimum wavelength at which a waveguide of an optical fiber will support only one propagating mode. For wavelengths below the cutoff wavelength, multimode transmission may occur and an additional source of dispersion may arise to limit the fiber's information carrying capacity. Cutoff wavelength will be reported herein as a cable cutoff wavelength. The cable cutoff wavelength is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

As used herein, the amplifying optical fiber can include at least one waveguide. Each waveguide of the amplifying optical fiber comprises an outer radius $r_c$. In embodiments, the outer radius $r_c$ of each waveguide corresponds to an outer radius $r_3$ of a depressed cladding region of that waveguide. Each waveguide is disposed within a common cladding of the amplifying optical fiber, where the common cladding has a radius $R_4$.

An "up-dopant" is a substance added to a glass that has a propensity to raise the refractive index relative to pure undoped silica. A "down-dopant" is a substance added to a glass that has a propensity to lower the refractive index relative to pure undoped silica. Examples of up-dopants include $GeO_2$ (germania), $Al_2O_3$, $P_2O_5$, $TiO_2$, Cl, Br, and alkali metal oxides, such as $K_2O$, $Na_2O$, $Li_2O$, $Cs_2O$, $Rb_2O$, and mixtures thereof. Examples of down-dopants include fluorine and boron.

The term "inter-waveguide crosstalk" in a multi-core (i.e., an optical fiber comprising more than one waveguide) optical fiber is a measure of how much power leaks from one waveguide to other waveguides of the multi-core optical fiber. The inter-waveguide crosstalk can be determined based on the coupling coefficient from one waveguide to another waveguide, which depends on the refractive index profile design of the waveguides, specifically the distance between the two waveguides, the structure of the cladding region(s) surrounding the core region of the two waveguides, and $\Delta\beta$, which depends on a difference in propagation constant $\beta$ values between the waveguides.

The inter-waveguide crosstalk (in dB) between a waveguide and its nearest neighbor waveguide is given by equation (3), where $P_2$ is the crosstalk power signal in one waveguide resulting from a signal with power $P_1$ launched into the other waveguide. As used herein, inter-waveguide crosstalk performance is referenced to a 50 m length L of optical fiber. However, inter-waveguide crosstalk performance can also be represented with respect to alternative optical fiber lengths, with appropriate scaling. For optical fiber lengths other than 50 m, the inter-waveguide crosstalk X(L) between a waveguide and its nearest neighbor waveguide can be determined using equation (4):

$$X = 10\log\left(\frac{P_2}{P_1}\right) \quad (3)$$

$$X(L) = X(50) + 10\log\left(\frac{L}{50}\right) \quad (4)$$

For example, for a 5 m length of optical fiber, the inter-waveguide crosstalk can be determined by adding "−10 dB" to the inter-waveguide crosstalk value for a 50 m length optical fiber. As another example, for a 100 m length of optical fiber, the inter-waveguide crosstalk can be determined by adding "−10 dB" to the inter-waveguide crosstalk value for a 10 m length of optical fiber.

Techniques for determining inter-waveguide crosstalk between waveguides in a multi-core optical fiber can be found in M. Li, et al., "Coupled Mode Analysis of Crosstalk in Dual-core fiber with Random Perturbations," in Optical Fiber Communication Conference, OSA Technical Digest (online), *Optical Society of America*, 2015, paper W2A.35, T. Hayashi et al., "125-μm-Cladding Eight-Core Multi-Core Fiber Realizing Ultra-High-Density Cable Suitable for O-Band Short-Reach Optical Interconnects," J. Lightwave Technology, Vol. 34, No. 1, pp. 85-92, published Jan. 1, 2016, and T. Hayashi et al., "Physical interpretation of intercore crosstalk in multicore fiber: Effects of macrobend, structure fluctuation, and macrobend," *Opt. Exp.*, vol. 21, no. 5, pp. 5401-5412, March 2013, the contents of which are all incorporated herein by reference in their entirety.

The mode field diameter (MFD) is measured using the Petermann II method and was determined from:

$$MFD = 2w \quad (5)$$

$$w = \frac{\int_0^\infty (f(r))^2}{\int_0^\infty \left(\frac{df(r)}{dr}\right)^2 r\,dr} \quad (6)$$

where f(r) is the transverse component of the electric field distribution of the light guided in a waveguide (core portion) and r is the radial coordinate of the waveguide (core portion) of the fiber. Unless otherwise specified, "mode field diameter" or "MFD" refers to the mode field diameter at 1550 nm.

The "numerical aperture" or NA of a core region of a waveguide of the optical fiber may be calculated using the relationship:

$$NA_{core\ region} = \sqrt{n_C^2 - n_{IC}^2}, \tag{7}$$

where $n_C$ is the index of refraction of the core region and $n_{IC}$ is the index of refraction of the inner cladding region of a waveguide of the optical fiber. The relative compositions of the inner cladding region and the core region may be selected such that the difference in the refractive indices yields core members having the desired numerical aperture.

While the numerical aperture of the core region of a waveguide of the optical fiber may be mathematically calculated, under certain circumstances it may be necessary to experimentally determine the numerical aperture. For example, in some situations, the index of refraction of a particular portion of the optical fiber may not be precisely known. Under such circumstances the numerical aperture of the core region of a waveguide of the optical fiber may be measured using an angular measurement technique similar to that described in the article entitled "Propagation losses of pump light in rectangular double-clad fibers" by Anping Liu and Kenichi Ueda, 3134 Optical Engineering, Vol. 35 No. 11, November 1996.

The phrase "peak power conversion efficiency," as used herein, refers to the power ratio defined as $(P_{out(\lambda 1)} - P_{in(\lambda 1)})/ P_{Pump(\lambda pump)}$, wherein $P_{out}$ is the output signal power for an input wavelength $\lambda 1$, $P_{in}$ is the input signal power for an input wavelength $\lambda 1$, and $P_{Pump}$ is the pump power at a given pump wavelength $\lambda pump$ for each waveguide of the optical fiber.

The "mode coupling coefficient," as used herein, represents the coupling of modes between adjacent propagating waveguides and can be calculated using the methods described in Tu et al., Optics Express, 15157, 20 (14), 2012 and Ye et al., Optics Express 23007 22 (19), 2014.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As noted herein, multi-core optical fibers are emerging as an attractive alternative for achieving increased capacity in submarine optical fiber cables. However, one limitation to the implementation of the multicore optical fibers in submarine optical fiber cables is the ability to amplify the signal from each of the waveguides in the multi-core optical fiber.

In particular, erbium-doped amplifying optical fiber has been proposed for use in these systems to amplify the optical signals propagating in individual waveguides of the submarine optical fiber cables. Since the length of the erbium-doped fiber used in amplifying optical fiber is less than 100 m and because the mode field diameters of the waveguides of the amplifying optical fiber are relatively small, the inter-waveguide crosstalk and tunneling losses in the amplifying optical fibers are also relatively small.

However, as the number of waveguides in the amplifying optical fiber increases, accompanied by the desire to not increase the overall fiber diameter beyond the standard 125 micron diameter dimension, it is important to improve the inter-waveguide crosstalk and reduce tunneling losses in the amplifying optical fibers used in conjunction with submarine optical fiber cables. Disclosed herein are amplifying optical fibers that address these needs.

In particular, disclosed herein are trench assisted, single mode, rare earth-doped amplifying optical fibers. The incorporation of a low-index trench (depressed cladding region) in the waveguide of the optical fiber may reduce inter-waveguide crosstalk between adjacent single-core amplifying optical fibers or between adjacent waveguides in a multi-core amplifying optical fiber. In embodiments, the amplifying optical fibers may have high peak power conversion efficiency and low tunneling losses.

Referring now to the figures, FIG. 1 schematically depicts a cross-sectional view of an amplifying optical fiber 100. According to the embodiments described herein, the amplifying optical fiber 100 comprises at least one waveguide 116 (such as waveguides 116a, 116b, 116c, and 116d) comprising a core region 132 that is doped with a rare-earth element, such as erbium, to facilitate amplification of optical signals propagating in the core region 132 of the waveguide. While FIG. 1 depicts an amplifying optical fiber 100 with four waveguides 116a, 116b, 116c, and 116d, it should be understood that the amplifying optical fiber 100 may contain fewer than four waveguides (such as one, two, or three waveguides) or greater than four waveguides. In embodiments, the amplifying optical fiber 100 may have greater than one waveguide, such a plurality of waveguides. In embodiments, the plurality of waveguides may comprise greater than or equal to two waveguides. In embodiments, the plurality of waveguides may comprise greater than or equal to four waveguides, greater than or equal to six waveguides, and the like.

In the embodiments described herein, the amplifying optical fiber 100 comprises a glass portion 112 and a coating portion 114 encircling and directly contacting the glass portion 112. The glass portion 112 comprises a plurality of waveguides, such as waveguides 116a, 116b, 116c, and 116d, and a common cladding 120. The common cladding 120 has a relative refractive index of $\Delta_4$ and comprises a longitudinal centerline 122 (positioned at R=0). In embodiments, the common cladding 120 is constructed of pure silica glass. In embodiments, the longitudinal centerline 122 of the common cladding 120 coincides with a longitudinal centerline of the amplifying optical fiber 100. The common cladding 120 comprises an outer surface 124 circumferentially surrounding and disposed a radial distance $R_4$ from the longitudinal centerline 22 such that the common cladding 120 has a radius $R_4$. The radial distance $R_4$ defines a radius of the glass portion 112 of the amplifying optical fiber 100. In embodiments, $R_4$ is less than or equal to 62.5 µm, less than or equal to 50 nm, or even less than or equal to 40 nm. For example, in embodiments, the common cladding 120 may have a radius $R_4$ greater than or equal to 40 µm and less than or equal to 62.5 µm, greater than or equal to 45 µm and less than or equal to 62.5 µm, greater than or equal to 50 µm and less than or equal to 62.5 µm, or even greater than or equal to 55 µm and less than or equal to 62.5 µm. In embodiments, the common cladding 120 may have a radius $R_4$ greater than or equal to 40 µm and less than or equal to 55 µm, greater than or equal to 40 µm and less than or equal to 50 µm, or even greater than or equal to 40 µm and less than or equal to 45 µm. In embodiments, the common cladding 120 may have a radius $R_4$ greater than or equal to 45 µm and less than or equal to 62.5 µm, greater than or equal to 45 µm and less than or equal to 55 µm, or even greater than or equal to 45 µm and less than or equal to 55 µm. In embodiments, the common cladding 120 may have a radius $R_4$ greater than or equal to 50 µm and less than or equal to 62.5 µm, greater than or equal to 50 µm and less than or equal to 57.5 µm, or even greater than or equal to 50 µm and less than or equal to 55 µm.

The waveguides 116a, 116b, 116c, and 116d extend through the common cladding 120. Each of the waveguides 116a, 116b, 116c, and 116d comprises a core longitudinal centerline 126 (corresponding to r=0 for each of the waveguides 116a, 116b, 116c, and 116d). In the embodiment depicted in FIG. 1, the waveguides 116a, 116b, 116c, and 116d are arranged equidistantly from the longitudinal centerline 122 of the common cladding 120 and separated from one another by a waveguide-to-waveguide separation distance 129. In the embodiments described herein, the waveguide-to-waveguide separation distance is the distance between the longitudinal centerlines of adjacent waveguides. In embodiments in which the spacing between waveguides is non-uniform such that the waveguide-to-waveguide separation distance varies from a particular waveguide to different adjacent waveguides, it is understood that the waveguide-to-waveguide separation distance of the particular waveguide refers to the shortest distance between the longitudinal centerlines of the particular waveguide and its nearest neighbor waveguide. In embodiments, the waveguide-to-waveguide separation distance 129 is greater than or equal to 25.0 µm. In embodiments, the waveguide-to-waveguide separation distance 129 is less than or equal to 50.0 µm. For example, in embodiments, the waveguide-to-waveguide separation distance 129 is greater than or equal to 25.0 µm and less than or equal to 50.0 µm, greater than or equal to 25.0 µm and less than or equal to 45.0 µm, greater than or equal to 25.0 µm and less than or equal to 43.0 µm, greater than or equal to 25.0 µm and less than or equal to 35.0 µm, or even greater than or equal to 25.0 µm and less than or equal to 30.0 µm. In embodiments, the waveguideto-waveguide separation distance 129 is greater than or equal to 30.0 µm and less than or equal to 50.0 µm, greater than or equal to 35.0 µm and less than or equal to 50.0 µm, greater than or equal to 40.0 µm and less than or equal to 50.0 µm, or even greater than or equal to 45.0 µm and less than or equal to 50.0 µm. In embodiments, the waveguide-to-waveguide separation distance 129 is greater than or equal to 30.0 µm and less than or equal to 45.0 µm, greater than or equal to 32.5 µm and less than or equal to 43 µm, greater than or equal to 32.5 µm and less than or equal to 35.0 µm, greater than or equal to 37.5 µm and less than or equal to 45.0 µm, greater than or equal to 40.0 µm and less than or equal to 45.0 µm, greater than or equal to 35.0 µm and less than or equal to 40.0 µm, or even greater than or equal to 35.0 µm and less than or equal to 37.5 µm. Such separation between the waveguides 116a, 116b, 116c, and 116d may facilitate a compact design for the amplifying optical fiber 100 while still maintaining an inter-waveguide crosstalk between each of the waveguides 116a, 116b, 116c, and 116d that is less than or equal to –30 dB at 1550 nm.

In embodiments, edges of the waveguides 116a, 116b, 116c, and 116d are separated from the outer surface 124 of the common cladding 120 by at least a minimum waveguide edge to glass edge distance 130. As depicted in FIG. 1, the minimum waveguide edge to glass edge distance 130 is the minimum distance from a point along the outer circumference of one of the waveguides 116a, 116b, 116c, and 116d (e.g., the point corresponding to the $r_3$ value for each waveguide, as described further herein with respect to FIG. 3) to a nearest point along the circumference of the outer surface 124 of the common cladding 120, as determined by a line segment between the point along the outer circumference of the waveguide and the nearest point along the circumference on the outer surface 124 of the common cladding 120 in a plane perpendicular to the longitudinal centerline 122 of the common cladding 120. In embodiments, the minimum waveguide edge to glass edge distance 130 is greater than or equal to 5.0 µm and less than or equal to 20.0 µm, greater than or equal to 5.0 µm and less than or equal to 15.0 µm, greater than or equal to 5.0 µm and less than or equal to 12.0 µm, or even greater than or equal to 5.0 µm and less than or equal to 10.0 µm. Without intending to be bound by any particular theory, it is believed that the extent of signal loss due to tunneling is dependent upon the minimum value for the minimum waveguide edge to glass edge distance 130, so maintaining the minimum waveguide edge to glass edge distance 130 in the range disclosed herein may minimize tunneling loss while maintaining separation between the waveguides 116a, 116b, 116c, and 116d to inhibit inter-waveguide crosstalk between the waveguides.

Referring still to FIG. 1, the coating portion 114 of the amplifying optical fiber 100 is depicted to include a primary coating 135 encircling and directly contacting the common cladding 120 and a secondary coating 134 encircling and directly contacting the primary coating 135. In embodiments, the primary coating 135 serves as a buffer to protect the glass portion 112 when the amplifying optical fiber 100 is bent, cabled, or spooled. The primary coating 135 may also serve to protect the outer surface 124 of the glass portion 112 from water absorption. The secondary coating 134 may be applied over the primary coating 135 and serves as a protective layer that prevents the glass portion 112 from being damaged during processing and use. The primary coating 135 is depicted to include a radius $R_5$ and the secondary coating 134 is depicted to include a radius $R_6$. In embodiments, $R_6$ defines an external radius of the amplifying optical fiber 100. In embodiments the outer diameter $(2*R_6)$ of the amplifying optical fiber 100 is less than or equal to 250.0 μm. In embodiments, the outer diameter $(2*R_6)$ of the amplifying optical fiber 100 is less than or equal to 210.0 μm or even less than or equal to 190.0 μm. The thickness of the primary coating is $T_P=R_5-R_4$. In embodiments, $T_P$ is less than or equal to 35.0 μm, less than or equal to 33 μm, less than or equal to 30.0 μm, less than or equal to 25.0 μm, less than or equal to 20.0 μm, or even less than or equal to 15.0 μm. In embodiments $T_P$ is greater than or equal to 10.0 μm and less than or equal to 35.0 μm or even greater than or equal to 10.0 μm and less than or equal to 30.0 μm. The thickness of the secondary coating is $T_S=R_6-R_5$. In embodiments, $T_S$ is less than or equal to 30.0 μm, less than or equal to 25.0 μm, less than or equal to 20.0 μm, or even less than or equal to 15.0 μm. In embodiments, $T_S$ is greater than or equal to 10.0 μm and less than or equal to 30.0 μm or even greater than or equal to 10.0 μm and less than or equal to 25.0 μm.

In embodiments, the length of the amplifying optical fiber 100 (i.e., the length of the amplifying optical fiber 100 in the direction of the longitudinal centerline 122 of the common cladding 120) may be greater than or equal to 1 meter and less than or equal to 100 meters or even less than or equal to 50 meters. For example, the length of the amplifying optical fiber 100 may be greater than or equal to 2 meters and less than or equal to 40 meters, greater than or equal to 3 meters and less than or equal to 30 meters, greater than or equal to 4 meters and less than or equal to 20 meters, or even greater than or equal to 5 meters and less than or equal to 20 meters.

Figure 2:
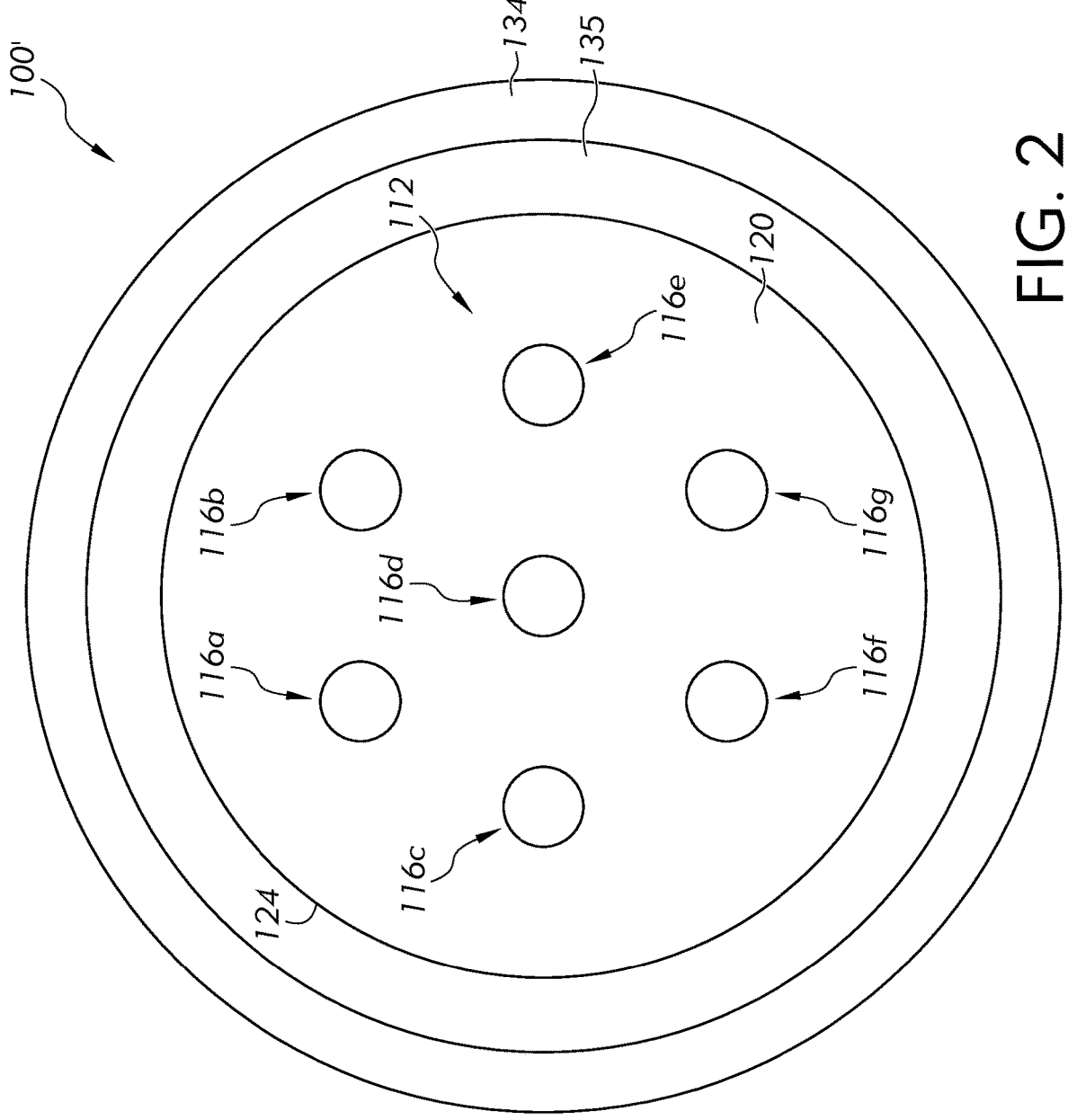
FIG. 2 schematically depicts a cross-sectional view of an amplifying optical fiber comprising at least one waveguide, specifically seven waveguides, according to one or more embodiments shown and described herein.

While FIG. 1 schematically depicts an amplifying optical fiber 100 comprising four waveguides 116a, 116b, 116c, and 116d, it should be understood that other embodiments are contemplated and possible, such as embodiments in which the amplifying optical fiber comprises greater than four waveguides, as noted herein, or even greater than 6 waveguides. For example, FIG. 2 schematically depicts an embodiment of an amplifying optical fiber 100' comprising seven waveguides 116a, 116b, 116c, 116d, 116e, 116f, and 116g. The structure and dimensions of the amplifying optical fiber 100', including the common cladding 120, waveguides 116a-116g, and coating portion 114 may be as described herein with respect to FIG. 1 and as further described herein with respect to FIGS. 3-7.

Figure 3:
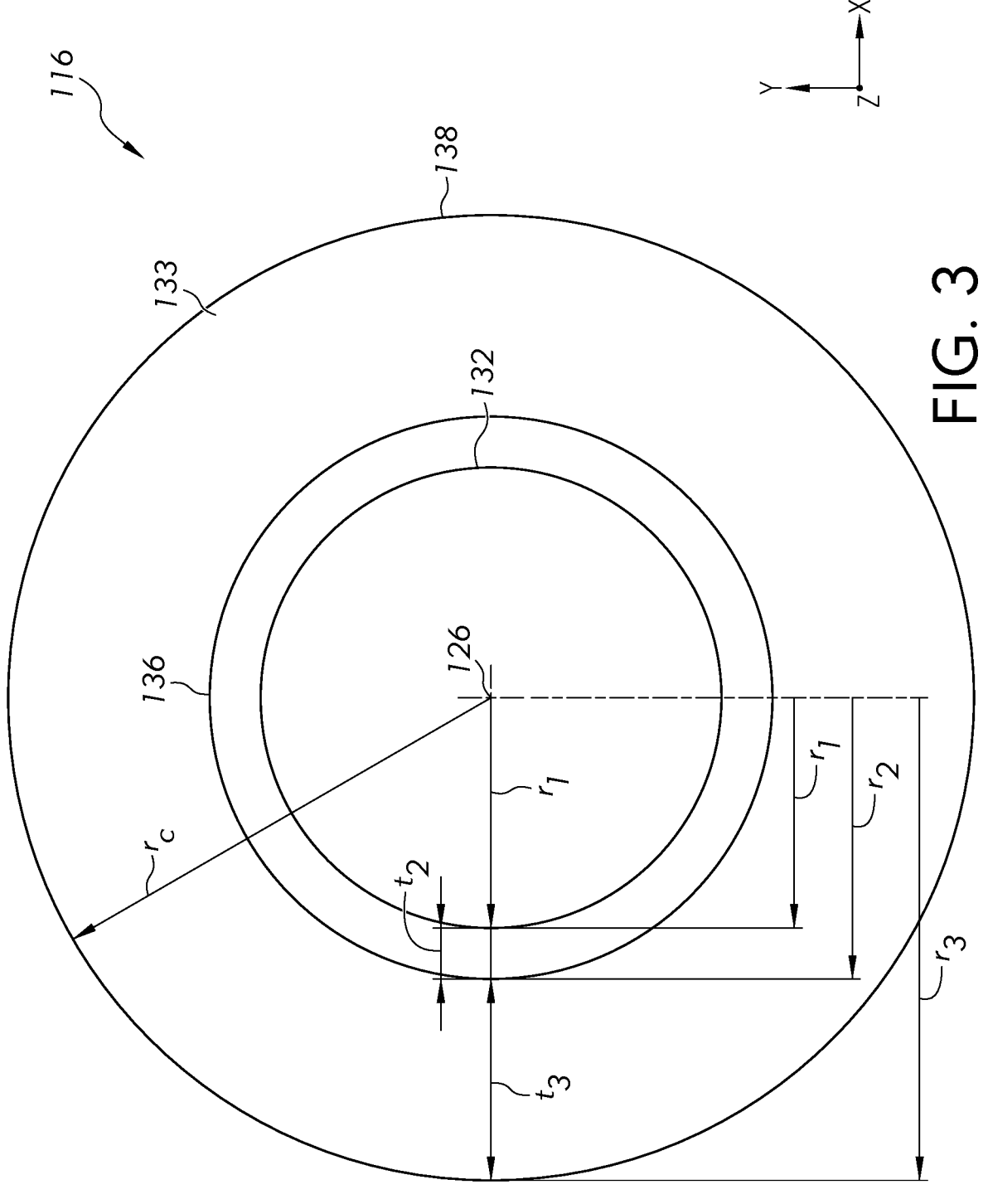
FIG. 3 schematically depicts a cross-sectional view of a waveguide of the amplifying optical fiber of FIG. 1 or FIG. 2 according to one more embodiments shown and described herein.

Referring now to FIGS. 1-3, FIG. 3 schematically depicts a cross sectional view of a waveguide 116 of the amplifying optical fiber 100 of FIG. 1 or the amplifying optical fiber 100' of FIG. 2 (such as, for example, waveguides 116a, 116b, 116c, or 116d of FIG. 1 and/or waveguides 116a, 116b, 116c, 116d, 116e, 116f, or 116g of FIG. 2). In embodiments, each of the waveguides 116 of the amplifying optical fibers 100, 100' described herein with respect to FIGS. 1 and 2 comprises the structure of the waveguide 116 depicted in FIG. 3. The waveguide 116 is depicted to comprise a core region 132 centered on a longitudinal centerline 126 and a cladding region 133. The cladding region 133 comprises an inner cladding region 136 encircling and directly contacting the core region 132 and a depressed cladding region 138 encircling and directly contacting the inner cladding region 136. In embodiments, the core region 132 and the cladding region 133 are concentric such that the cross section of the waveguide 116 is generally circular symmetric with respect to the longitudinal centerline 126. In the embodiment depicted in FIG. 3, the waveguide 116 has an overall waveguide radius $r_c$. The core region 132 has a radius $r_1$ and the depressed cladding region 138 has a radius $r_3$ that defines an outer radius of the waveguide 116 such that $r_3$ corresponds to the radius $r_c$ associated with the waveguide 116. The inner cladding region 136 extends between the radius $r_1$ of the core region 132 and an inner cladding radius $r_2$ of the inner cladding region 136 such that the inner cladding region 136 has a thickness $t_2=r_2-r_1$ in the radial direction. The depressed cladding region 138 has a thickness $t_3=r_3-r_2$ in the radial direction. Accordingly, in the embodiments described herein, the waveguide radius $r_c$ corresponds to the radius $r_3$ of the depressed cladding region 138 and $r_3>r_2>r_1$. The structure, composition, and optical properties of each of the core region 132, the inner cladding region 136, and the depressed cladding region 138 are described in greater detail herein.

The radius $r_1$ of the core region 132 is selected such that the waveguide is single-moded at the wavelength for which amplification of the optical signal occurs. In embodiments described herein, the radius $r_1$ of the core region 132 of the waveguide 116 is greater than or equal to 1.5 μm. In embodiments, the radius $r_1$ of the core region 132 of the waveguide 116 is less than or equal to 5 μm. For example, in embodiments, the radius $r_1$ of the core region 132 of the waveguide 116 may be greater than or equal to 1.5 μm and less than or equal to 5.0 μm, greater than or equal to 1.5 μm and less than or equal to 4.0 μm, greater than or equal to 1.6 μm and less than or equal to 3.0 μm, greater than or equal to 1.7 μm and less than or equal to 2.5 μm, or even greater than or equal to 1.8 μm and less than or equal to 2.0 μm.

In the embodiments described herein, the core region 132 of the waveguide 116 has a core relative refractive index $\Delta_1$ relative to the common cladding 120 of the amplifying optical fiber 100 and a maximum core relative refractive index $\Delta_{1max}$ relative to the common cladding 120 of the amplifying optical fiber 100. The maximum core relative refractive index $\Delta_{1max}$ refers to the maximum value of the core relative refractive index $\Delta_1$ the core region 132 of the waveguide 116. In embodiments, $\Delta_1$ may be equal to $\Delta_{1max}$ throughout the core region 132, such as in embodiments where the core region 132 has a step-index profile as described herein. In other embodiments, $\Delta_1$ may be equal to $\Delta_{1max}$ at or proximate to the core longitudinal centerline 126, such as in embodiments where the core region 132 has a graded-index profile as described herein. In the embodiments described herein, $\Delta_{1max} \geq \Delta_1 > \Delta_4$.

In embodiments, the core relative refractive index $\Delta_1$ may be greater than or equal to 0.8% and less than or equal to 2%. For example, the core relative refractive index $\Delta_1$ may be greater than or equal to 0.8% and less than or equal to 1.9%, greater than or equal to 0.8% and less than or equal to 1.8%, greater than or equal to 0.8% and less than or equal to 1.7%, greater than or equal to 0.8% and less than or equal to 1.6%, greater than or equal to 0.8% and less than or equal to 1.5%, greater than or equal to 0.8% and less than or equal to 1.4%, greater than or equal to 0.8% and less than or equal to 1.3%, or even greater than or equal to 0.8% and less than or equal to 1.2%. In embodiments, the core relative refractive index $\Delta_1$ may be greater than or equal to 0.9% and less than or equal to 2%, greater than or equal to 0.9% and less than or equal to 1.9%, greater than or equal to 0.9% and less than or equal to 1.8%, greater than or equal to 0.9% and less than or equal to 1.7%, greater than or equal to 0.9% and less than or equal to 1.6%, greater than or equal to 0.9% and less than or equal to 1.5%, greater than or equal to 0.9% and less than or equal to 1.4%, greater than or equal to 0.9% and less than or equal to 1.3%, or even greater than or equal to 0.9% and less than or equal to 1.2%. In embodiments, the core relative refractive index $\Delta_1$ may be greater than or equal to 1.0% and less than or equal to 2%, greater than or equal to 1.0% and less than or equal to 1.9%, greater than or equal to 1.0% and less than or equal to 1.8%, greater than or equal to 1.0% and less than or equal to 1.7%, greater than or equal to 1.0% and less than or equal to 1.6%, greater than or equal to 1.0% and less than or equal to 1.5%, greater than or equal to 1.0% and less than or equal to 1.4%, greater than or equal to 1.0% and less than or equal to 1.3%, or even greater than or equal to 1.0% and less than or equal to 1.2%.

In the embodiments described herein, the core relative refractive index $\Delta_1$ may be achieved in the core region 132 by up-doping the core region 132 with one or more up-dopants that increase the refractive index of the glass of the core region 132 relative to the glass of the common cladding 120. For example, the glass of the core region 132 may be formed from silica-based glass up-doped with one or more of $GeO_2$, $Al_2O_3$, $P_2O_5$, $TiO_2$, $ZrO_2$, $Nb_2O_5$ and/or $Ta_2O_5$. In embodiments, the core region 132 may be silica-based glass up-doped with $GeO_2$. To achieve the aforementioned values for the core relative refractive index $\Delta_1$, the glass of the core region 132 may contain greater than or equal to 8.0 wt. % and less than or equal to 36 wt. % $GeO_2$. For example, in embodiments, the core region 132 may comprise greater than or equal to 8.0 wt. % and less than or equal to 30 wt. % $GeO_2$, greater than or equal to 10.0 wt. % and less than or equal to 28 wt. % $GeO_2$, greater than or equal to 12.0 wt. % and less than or equal to 26 wt. % $GeO_2$, greater than or equal to 13.0 wt. % and less than or equal to 24 wt. % $GeO_2$, or even greater than or equal to 14.0 wt. % and less than or equal to 22 wt. % $GeO_2$.

In the embodiments described herein, the core region 132 of the waveguide 116 is also up-doped with an active element that increases the index of refraction of the core region 132 as well as facilitates gain action (i.e., amplification) of optical signals propagating in the core region 132 of the waveguide 116. For example, in the embodiments described herein, the core region 132 of the waveguide 116 further comprises a rare-earth dopant (such as oxides of Yb, Er, Nd Tm, Sm and Tb) to facilitate gain action in the core region 132. In particular, the core region 132 of the waveguide comprises $Er_2O_3$. In embodiments, the core region 132 of the waveguide 116 comprises greater than or equal to 500 parts per million by weight (ppm) of $Er_2O_3$. In embodiments, the core region 132 of the waveguide 116 comprises less than or equal to 10,000 ppm $Er_2O_3$ or even less than or equal to 7500 ppm of $Er_2O_3$. In embodiments, the core region 132 of the waveguide 116 comprises greater than or equal to 500 ppm and less than or equal to 10,000 ppm of $Er_2O_3$. In embodiments, the core region 132 of the waveguide 116 comprises greater than or equal to 500 ppm and less than or equal to 7500 ppm of $Er_2O_3$. In embodiments, the core region 132 of the waveguide 116 comprises greater than or equal to 500 ppm and less than or equal to 1500 ppm of $Er_2O_3$, greater than or equal to 750 ppm and less than or equal to 1250 ppm of $Er_2O_3$, greater than or equal to 850 ppm and less than or equal to 1200 ppm of $Er_2O_3$, or even greater than or equal to 900 ppm and less than or equal to 1150 ppm of $Er_2O_3$. In these embodiments, the waveguide 116 may be suitable for C-band amplification. In embodiments, the core region 132 of the waveguide 116 comprises, greater than or equal to 2000 ppm and less than or equal to 10,000 ppm of $Er_2O_3$, greater than or equal to 2000 ppm and less than or equal to 7500 ppm of $Er_2O_3$, greater than or equal to 2500 ppm and less than or equal to 10,000 ppm of $Er_2O_3$, greater than or equal to 2500 ppm and less than or equal to 7500 ppm of $Er_2O_3$, greater than or equal to 2500 ppm and less than or equal to 6500 ppm of $Er_2O_3$, greater than or equal to 2500 ppm and less than or equal to 5500 ppm of $Er_2O_3$, greater than or equal to 2500 ppm and less than or equal to 4500 ppm of $Er_2O_3$, or even greater than or equal to 3000 ppm and less than or equal to 4000 ppm of $Er_2O_3$. In these embodiments, the waveguide 116 may be suitable for L-band amplification.

In embodiments, the core region 132 of the waveguide 116 may be formed such that the $Er_2O_3$ is uniformly distributed throughout the core region 132. In these embodiments, the $Er_2O_3$ works in cooperation with other up-dopants in the core region 132, such as $GeO_2$, to increase the index of refraction of the glass throughout the core region as well as to provide gain action to amplify optical signals propagating in the core region 132.

Figure 4:
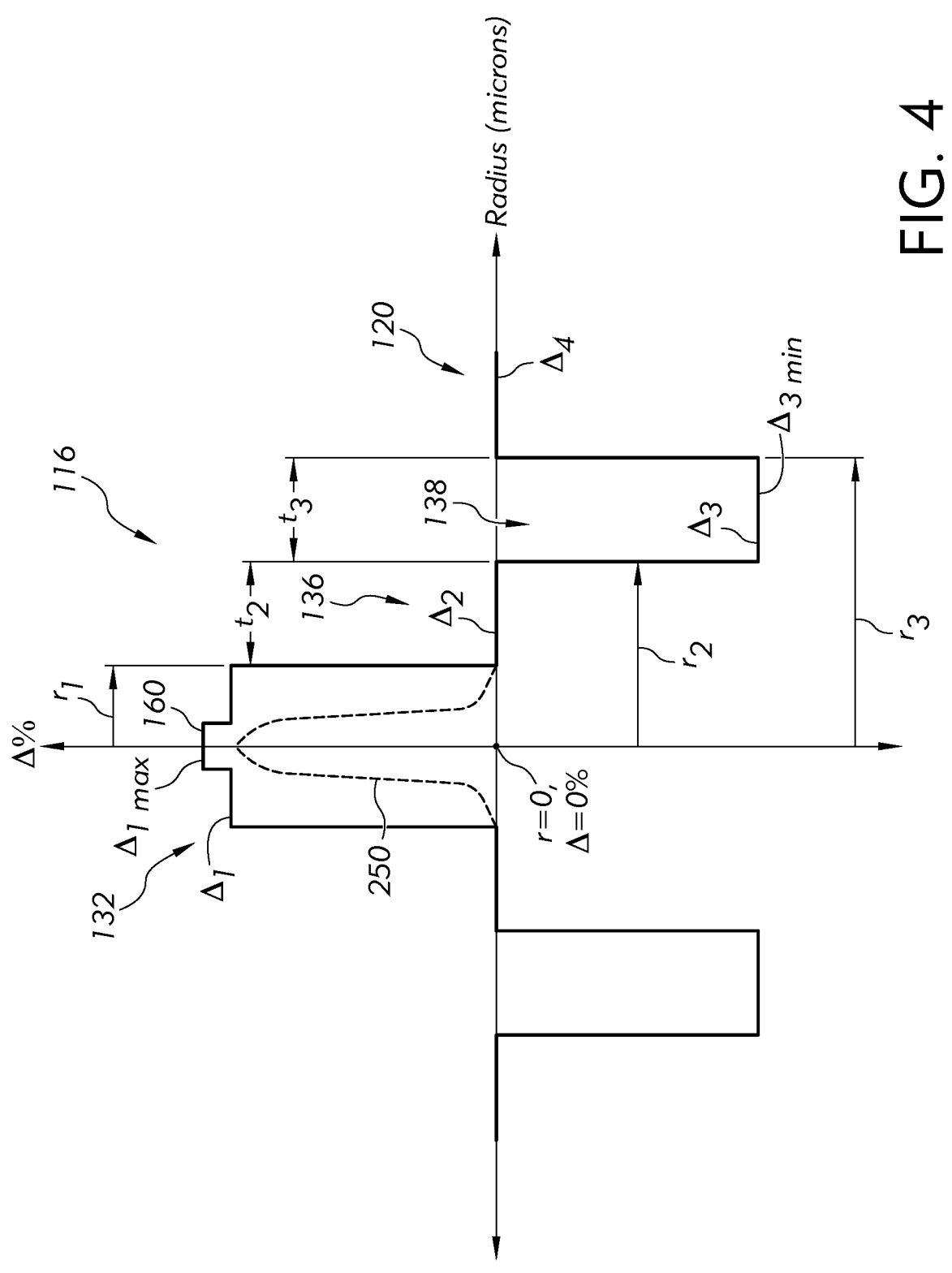
FIG. 4 graphically depicts the relative refractive index (Δ%) as a function of the radius (r) of a waveguide of an amplifying optical fiber according to one or more embodiments shown and described herein.

In other embodiments, the core region 132 of the waveguide 116 may be formed such that the $Er_2O_3$ has a graded distribution in the core region 132. Referring to FIGS. 3 and 4 by way of example, FIG. 4 shows a relative refractive index profile of a waveguide 116 containing a graded distribution of $Er_2O_3$ in the core region 132 in addition to at least $GeO_2$ in the core region 132. FIG. 4 also includes curve 250 showing the relative distribution of $Er_2O_3$ in the core region 132 as a function of radial position. As depicted in FIG. 4, the concentration of $Er_2O_3$ in the core region 132 is a maximum at or near the longitudinal centerline 126 of the core region 132 and decreases in the core region 132 with increasing distance from the longitudinal centerline 126. In this embodiment, the graded distribution of $Er_2O_3$ in the core region 132 creates an additional step (core step 160) in the relative refractive index profile of the core region 132 where the increased concentration of $Er_2O_3$ (in combination with $GeO_2$ and optionally $Al_2O_3$) causes a localized increase in the core relative refractive index $\Delta_1$ proximate the longitudinal centerline 126 of the core region 132. Thus, the $Er_2O_3$ works in cooperation with other up-dopants in the core region 132, such as $GeO_2$, to locally increase the index of refraction of the glass in the core region 132 as well as to provide gain action to amplify optical signals propagating in the core region 132.

Referring again to FIG. 3, in embodiments, the core region 132 of the waveguide 116 may further comprise $Al_2O_3$. Like $GeO_2$, $Al_2O_3$ increases the refractive index of the silica-based glass of the core region 132 and, as such, works in cooperation with $GeO_2$ to set the core relative refractive index $\Delta_1$ of the core region 132. In addition, $Al_2O_3$ added to silica-based glass increases the solubility of $Er_2O_3$ in the glass, inhibiting phase separation of the glass into erbium-rich and erbium-poor phases, and thereby improving the distribution of $Er_2O_3$ in the glass. Moreover, $Al_2O_3$ added to the glass of the core region 132 also assists in setting the gain shape of the core region 132. The term "gain shape" generally refers to the relative amount of erbium fluorescence in the core region 132 based on the wavelength of light propagating in the core region 132. Additions of $Al_2O_3$ to the glass of the core region 132 broaden the gain shape of the core region, increasing the line-width of the erbium fluorescence band and providing greater application flexibility to the amplifying optical fiber 100.

In embodiments, the core region 132 of the waveguide 116 may comprise greater than or equal to 1 wt. % $Al_2O_3$. In embodiments, the core region 132 of the waveguide 116 may comprise less than or equal to 10 wt. % $Al_2O_3$. For example, in embodiments, the core region 132 of the waveguide 116 may comprise greater than or equal to 1.0 wt. % and less than or equal to 10 wt. % $Al_2O_3$, greater than or equal to 2.0 wt. % and less than or equal to 10 wt. % $Al_2O_3$, greater than or equal to 3.0 wt. % and less than or equal to 10 wt. % $Al_2O_3$, greater than or equal to 4.0 wt. % and less than or equal to 9.5 wt. % $Al_2O_3$, greater than or equal to 5.0 wt. % and less than or equal to 9.5 wt. % $Al_2O_3$, greater than or equal to 6.0 wt. % and less than or equal to 9.0 wt. % $Al_2O_3$, or even greater than or equal to 7.0 wt. % and less than or equal to 9.0 wt. % $Al_2O_3$.

In embodiments where $Al_2O_3$ is included in the core region 132, the $Al_2O_3$ may be distributed in the core region 132 in a similar manner as $Er_2O_3$. That is, in embodiments in which the core region 132 of the waveguide 116 is formed such that the $Er_2O_3$ is uniformly distributed throughout the core region 132, $Al_2O_3$ may also be uniformly distributed throughout the core region 132. Similarly, in embodiments in which the core region 132 of the waveguide 116 is formed such that the $Er_2O_3$ has a graded distribution in the core region 132, $Al_2O_3$ may have a similar graded distribution in the core region 132. Alternatively, in embodiments in which the core region 132 of the waveguide 116 is formed such that the $Er_2O_3$ has a graded distribution in the core region 132, $Al_2O_3$ may be uniformly distributed throughout the core region 132.

In embodiments, the core region 132 may have a step-index profile with a core alpha value greater than or equal to 10, such as greater than or equal to 20, or even greater than or equal to 30. In embodiments, the core region 132 may have a graded-index profile with a core alpha value less than 10, such as less than or equal to 5, less than or equal to 4, less than or equal to 3, or even less than or equal to 2. In embodiments, the core region 132 may have a graded-index profile with a core alpha value greater than 2 and less than 20, such as greater than or equal to 3 and less than 15, greater than or equal to 4 and less than 13, greater than or equal to 5 and less than 12, or even greater than or equal to 6 and less than or equal to 11.

In embodiments described herein, the radial thickness $t_2$ of the inner cladding region 136 of the waveguide 116 is greater than or equal to 6.0 µm. In embodiments, the radial thickness $t_2$ of the inner cladding region 136 of the waveguide 116 is less than or equal to 8.5 µm. For example, in embodiments, the radial thickness $t_2$ of the inner cladding region 136 of the waveguide 116 may be greater than or equal to 5.0 µm and less than or equal to 9.5 µm, greater than or equal to 5.5 µm and less than or equal to 9.0 µm, greater than or equal to 6 µm and less than or equal to 8.5 µm, greater than or equal to 6.5 µm and less than or equal to 8.0 µm, greater than or equal to 7.0 µm and less than or equal to 8 µm, or even greater than or equal to 7.5 µm and less than or equal to 8.0 µm.

In the embodiments described herein, the inner cladding region 136 of the waveguide 116 has an inner cladding relative refractive index $\Delta_2$ relative to the common cladding 120 of the amplifying optical fiber 100. In embodiments, the inner cladding relative refractive index $\Delta_2$ is less than or equal to the core relative refractive index $\Delta_1$ and less than the maximum core relative refractive index $\Delta_{1max}$ (i.e., $\Delta_2 \leq \Delta_1$, $\Delta_2 < \Delta_{1max}$). In embodiments, $\Delta_2 > \Delta_4$. In embodiments, the refractive index of the inner cladding region 136 is the same as the refractive index of the common cladding 120 of the amplifying optical fiber 100 such that the inner cladding relative refractive index $\Delta_2$ is 0. In embodiments, both the inner cladding region 136 and the common cladding 120 of the amplifying optical fiber 100 may be formed from un-doped silica glass (i.e., silica-based glass without any intentionally added dopants). Alternatively, both the inner cladding region 136 and the common cladding 120 of the amplifying optical fiber 100 may be formed from silica glass up-doped (or down-doped) with the same dopants such that the inner cladding relative refractive index $\Delta_2$ is 0.

In embodiments described herein, the radial thickness $t_3$ of the depressed cladding region 138 of the waveguide 116 is greater than or equal to 2.0 µm. In embodiments, the radial thickness $t_3$ of the depressed cladding region 138 of the waveguide 116 is less than or equal to 8.0 µm. For example, in embodiments, the radial thickness $t_3$ of the depressed cladding region 138 of the waveguide 116 may be greater than or equal to 2 µm and less than or equal to 8.0 µm, greater than or equal to 2.5 µm and less than or equal to 7.5 µm, greater than or equal to 3.0 µm and less than or equal to 7.0 µm, or even greater than or equal to 3.5 µm and less than or equal to 6.5 µm.

The depressed cladding region 138 has a depressed relative refractive index $\Delta_3$. In embodiments, the depressed relative refractive index $\Delta_3$ is less than or equal to the inner cladding relative refractive index $\Delta_2$ of the inner cladding region 136 throughout the depressed cladding region 138. The depressed relative refractive index $\Delta_3$ may also be less than or equal to the relative refractive index $\Delta_4$ of the common cladding 120 of the amplifying optical fiber 100 (see FIG. 1) such that the depressed cladding region 138 forms a trench in the relative refractive index profile of the waveguide 116. The term "trench," as used herein, refers to a region of the waveguide that is, in radial cross section, surrounded by regions of the optical fiber (e.g., the inner cladding region 136 and the common cladding 120) having relatively higher refractive indexes.

In embodiments, the depressed relative refractive index $\Delta_3$ may be constant throughout the depressed cladding region 138. In other embodiments, the depressed relative refractive index $\Delta_3$ may vary with radial coordinate r (radius) and be represented as $\Delta_3(r)$. In embodiments, the depressed relative refractive index $\Delta_3(r)$ within the depressed cladding region 138 comprises a minimum depressed relative refractive index $\Delta_{3min}$. In embodiments $\Delta_{1max} \geq \Delta_1 \geq \Delta_2 > \Delta_3$. In embodiments $\Delta_{1max} \geq \Delta_1 \geq \Delta_2 > \Delta_{3min}$. In embodiments, $\Delta_2 \geq \Delta_3$ such that the depressed cladding region 138 forms a depressed-index trench in a relative refractive index profile of each waveguide between $r_2$ and $r_3$. In embodiments, $\Delta_{3min} < \Delta_4$.

Referring to FIGS. 4-7, in embodiments, the depressed cladding region 138 comprises silica glass having one or more down-dopants, such as fluorine. In embodiments, the down-dopant concentration within the depressed cladding region 138 is uniform as a function of radial distance from the longitudinal centerline 126 of the waveguide 116 such that the relative refractive index profile of the depressed cladding region 138 has a rectangular shape, as depicted in the relative refractive index profiles of FIGS. 4, 5, and 7.

Figure 6:
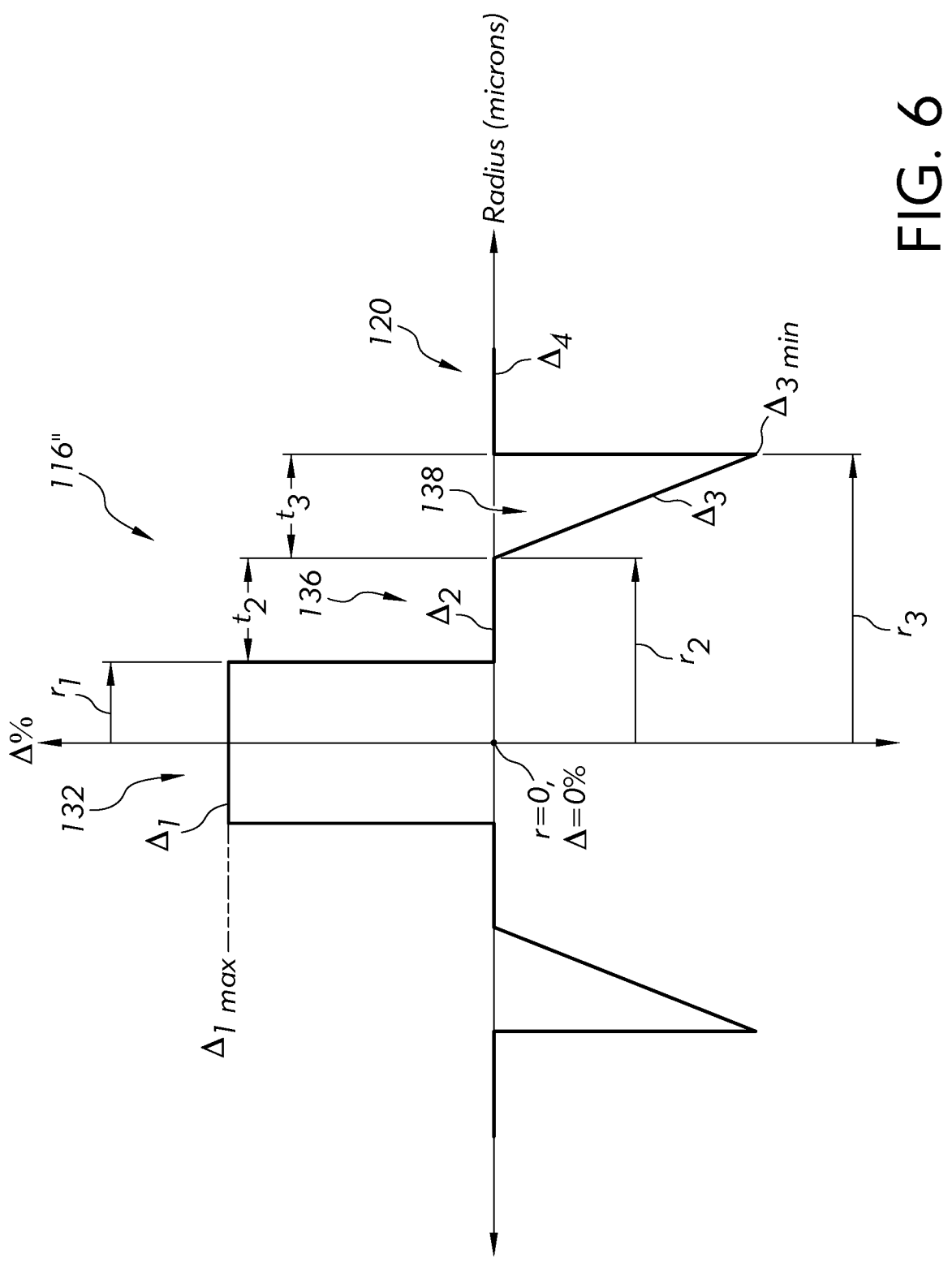
FIG. 6 graphically depicts the relative refractive index (Δ%) as a function of the radius (r) of a waveguide of an amplifying optical fiber according to one or more embodiments shown and described herein.

In embodiments, the down-dopant concentration within the depressed cladding region 138 varies as a function of radial distance from the longitudinal centerline 126 of the waveguide 116 such that the relative refractive index profile of the depressed cladding region 138 has a triangular or continuously sloping shape. For example, in embodiments, the down dopant concentration increases in the depressed cladding region 138 as a function of increasing radial distance from the longitudinal centerline 126 of the waveguide 116, reaching a maximum at or near the radius $r_3$. In such embodiments, the depressed relative refractive index $\Delta_3(r)$ within the depressed cladding region 138 decreases with increasing radial distance from the longitudinal centerline 126 of the waveguide 116 to a depressed minimum relative refractive index $\Delta_{3min}$ at $r=r_3$. The depressed cladding region 138 with a triangular shaped relative refractive index profile as depicted in FIG. 6 corresponds to an embodiment in which the dopant concentration is adjusted so that the slope of the depressed relative refractive index $\Delta_3$ is constant with increasing radial distance.

In embodiments, the maximum value of the fluorine concentration in the depressed cladding region 138 is greater than or equal to 0.5 wt. % and less than or equal to 2.5 wt. %. For example, the maximum fluorine concentration in the depressed cladding region may be greater than or equal to 0.6 wt. % and less than or equal to 2.4 wt. %, greater than or equal to 0.7 wt. % and less than or equal to 2.3 wt. %, greater than or equal to 0.8 wt. % and less than or equal to 2.2 wt. %, greater than or equal to 0.9 wt. % and less than or equal to 2.1 wt. %, or even greater than or equal to 1.0 wt. % and less than or equal to 2.0 wt. %.

In embodiments, $\Delta_{3min}$ of the depressed cladding region 138 is less than or equal −0.1% and greater than or equal to −0.7%, less than or equal −0.2% and greater than or equal to −0.6%, less than or equal −0.2% and greater than or equal to −0.5% or even less than or equal −0.3% and greater than or equal to −0.5%.

The radial thickness of a particular glass portion of the waveguide 116 may be interrelated with a volume of the relative refractive index of the particular glass region. Specifically, a glass region 'i' with a relative refractive index $\Delta_i\%$, an inner radius $r_{in}$ and an outer radius $r_{out}$ may have a relative refractive index volume $V_i$ defined as:

$$V_i = 2\int_{r_{in}}^{r_{out}} |\Delta_i(r)|^* r \, dr. \tag{8}$$

Accordingly, the depressed cladding region 138 may have a relative refractive index volume $V_3$, referred to herein as a trench volume $V_T$, of:

$$V_T = 2\int_{r_2}^{r_3} |\Delta_3(r)|^* r \, dr. \tag{9}$$

Without wishing to be bound by theory, it is believed that the trench volume $V_T$ within the depressed cladding region 138 influences the mode field diameter of the waveguide 116. In particular, it is believed that larger trench volumes $V_T$ tend to confine the light travelling through the waveguide 116 and make the mode field diameter of each waveguide 116 smaller. In embodiments, the depressed cladding region 138 comprises a trench volume $V_T$ of greater than or equal to 10% $\mu m^2$. For example, the depressed cladding region 138 may comprise a trench volume $V_T$ of greater than or equal to 10% $\mu m^2$ and less than or equal to 60% $\mu m^2$, greater than or equal to 20% $\mu m^2$ and less than or equal to 60% $\mu m^2$, greater than or equal to 30% $\mu m^2$ and less than or equal to 60% $\mu m^2$, or even greater than or equal to 40% $\mu m^2$ and less than or equal to 60% $\mu m^2$.

As noted herein, the amplifying optical fibers may have greater than one waveguide disposed in the common cladding. In embodiments in which the amplifying optical fiber comprises greater than one waveguide, each of the waveguides may have the same relative refractive index profile. Alternatively, in embodiments in which the amplifying optical fiber comprises greater than one waveguide, one or more of the waveguides may have a different relative refractive index profile.

In embodiments, the numerical aperture (NA) of the waveguide 116 is greater than or equal to 0.15 and less than or equal to 0.3. In embodiments, the numerical aperture of the waveguide 116 is greater than or equal to 0.18 and less than or equal to 0.28. In embodiments, the numerical aperture of the waveguide is greater than or equal to 0.18 and less than or equal to 0.25. In embodiments, the numerical aperture of the waveguide is greater than or equal to 0.19 and less than or equal to 0.23. In embodiments, the numerical aperture of the waveguide is greater than or equal to 0.19 and less than or equal to 0.21.

In embodiments, the mode field diameter of the waveguide 116 at 1550 nm is greater than or equal to 5 $\mu m$ and less than or equal to 8 $\mu m$. For example, in embodiments, the mode field diameter of the waveguide 116 may be greater than or equal to 5.0 $\mu m$ and less than or equal to 7.5 $\mu m$, greater than or equal to 5.0 $\mu m$ and less than or equal to 7.0 $\mu m$, greater than or equal to 5.0 $\mu m$ and less than or equal to 6.5 $\mu m$, 5.5 $\mu m$ and less than or equal to 7.5 $\mu m$, greater than or equal to 5.5 $\mu m$ and less than or equal to 7.0 $\mu m$, or even greater than or equal to 5.5 $\mu m$ and less than or equal to 6.5 $\mu m$, to facilitate coupling with standard single mode fibers.

In embodiments, the cutoff wavelength of the waveguide 116 is less than or equal to 1500 nm. For example, in embodiments, the cutoff wavelength of the waveguide 116 is less than or equal to 1400 nm, less than or equal to 1260 nm, less than or equal to 950 nm or even less than or equal to 900 nm.

In embodiments, the peak power conversion efficiency of the waveguide 116 is greater than or equal to 50%. For example, in embodiments the peak power conversion efficiency of the waveguide 116 is greater than or equal to 55%, greater than or equal to 60%, greater than or equal to 65%, greater than or equal to 70%, or even greater than or equal to 75%.

Techniques used to determine the inter-waveguide crosstalk between adjacent waveguides (when a plurality of waveguides are present in the amplifying optical fiber) in the amplifying optical fibers described herein may be dependent on the type of amplifying optical fiber. For amplifying optical fibers operating in the C-band amplification range, inter-waveguide crosstalk may be determined by measuring (or calculating) the signal in a waveguide over the application length when light is launched in a nearest neighbor waveguide at 1570 nm. For amplifying optical fibers operating in the L-band amplification range, inter-waveguide crosstalk may be determined by measuring (or calculating) the signal in a waveguide over the application length when light is launched in a nearest neighbor waveguide at 1610 nm.

In embodiments, the inter-waveguide crosstalk between a waveguide and its nearest neighbor waveguide (when a plurality of waveguides are present in the amplifying optical fiber) in the amplifying optical fibers described herein is less than or equal to −30 dB, less than or equal to −35 dB, less than or equal to −40 dB, less than or equal to −45 dB, less than or equal to −50 dB, less than or equal to −55 dB, less than or equal to −60 dB, less than or equal to −65 dB, less than or equal to −70 dB, less than or equal to −75 dB, less than or equal to −80 dB, less than or equal to −85 dB, less than or equal to −90 dB, less than or equal to −95 dB, less than or equal to −100 dB, less than or equal to −110 dB, less than or equal to −120 dB, less than or equal to −130 dB, less than or equal to −140 dB, less than or equal to −150 dB, less than or equal to −160 dB, or even less than or equal to −170 dB, as measured for a 50 m length of the amplifying optical fiber having a bend radius of less than or equal to 70 mm and operating at a wavelength of 1550 nm. Without wishing to be bound by theory, it is believed that larger trench volumes $V_T$ tend to confine the light traveling through the waveguide 116 to the waveguide, thereby preventing light within the waveguide from reaching an adjacent waveguide, thereby reducing inter-waveguide crosstalk between adjacent waveguides.

EXAMPLES

The embodiments described herein will be further clarified by the following examples.

Referring now to FIGS. 3-7, FIGS. 4-7 graphically depict relative refractive index profiles of four modeled waveguides 116, 116', 116", 116"' in keeping with embodiments of the present disclosure. Each of the waveguides has a cross section as depicted in FIG. 3.

In particular, FIG. 4 graphically depicts a relative refractive index profile of a waveguide 116 disposed in a common cladding 120. The core region 132 of the waveguide comprises silica-based glass up-doped with $GeO_2$, $Er_2O_3$, and $Al_2O_3$. Both $Er_2O_3$ and $Al_2O_3$ have a graded distribution in the core region 132 such that the concentration of $Er_2O_3$ and $Al_2O_3$ is a maximum at the longitudinal centerline 126 of the core region and decreases with increasing distance from the longitudinal centerline 126. The concentration of dopants in the core region 132 results in a step-index profile (i.e., with a core alpha value greater than 10). In this example, the step-index profile of the waveguide 116 further comprises a core step 160 due to the distribution of $Er_2O_3$ and $Al_2O_3$ proximate to the longitudinal centerline 126 of the core region. The core region 132 has a core relative refractive index $\Delta_1$ and a maximum core relative refractive index $\Delta_{1max}$.

The inner cladding region 136 of the waveguide 116 surrounds the core region 132 and comprises un-doped silica glass with an inner cladding relative refractive index $\Delta_2$ equal to 0%. Accordingly, $\Delta_{1max} > \Delta_2$.

The depressed cladding region 138 surrounds the inner cladding region 136 and comprises silica-based glass down-doped with fluorine. The down-doping of the glass creates a rectangular relative refractive index profile (also referred to herein as a rectangular "trench") with a depressed relative refractive index $\Delta_3$ and a minimum depressed relative refractive index $\Delta_{3min}$. In this embodiment, $\Delta_3 = \Delta_{3min}$ throughout the depressed cladding region 138 resulting in the rectangular shape of the relative refractive index profile. In this, example, $\Delta_{1max} > \Delta_2 > \Delta_{3min}$.

Figure 5:
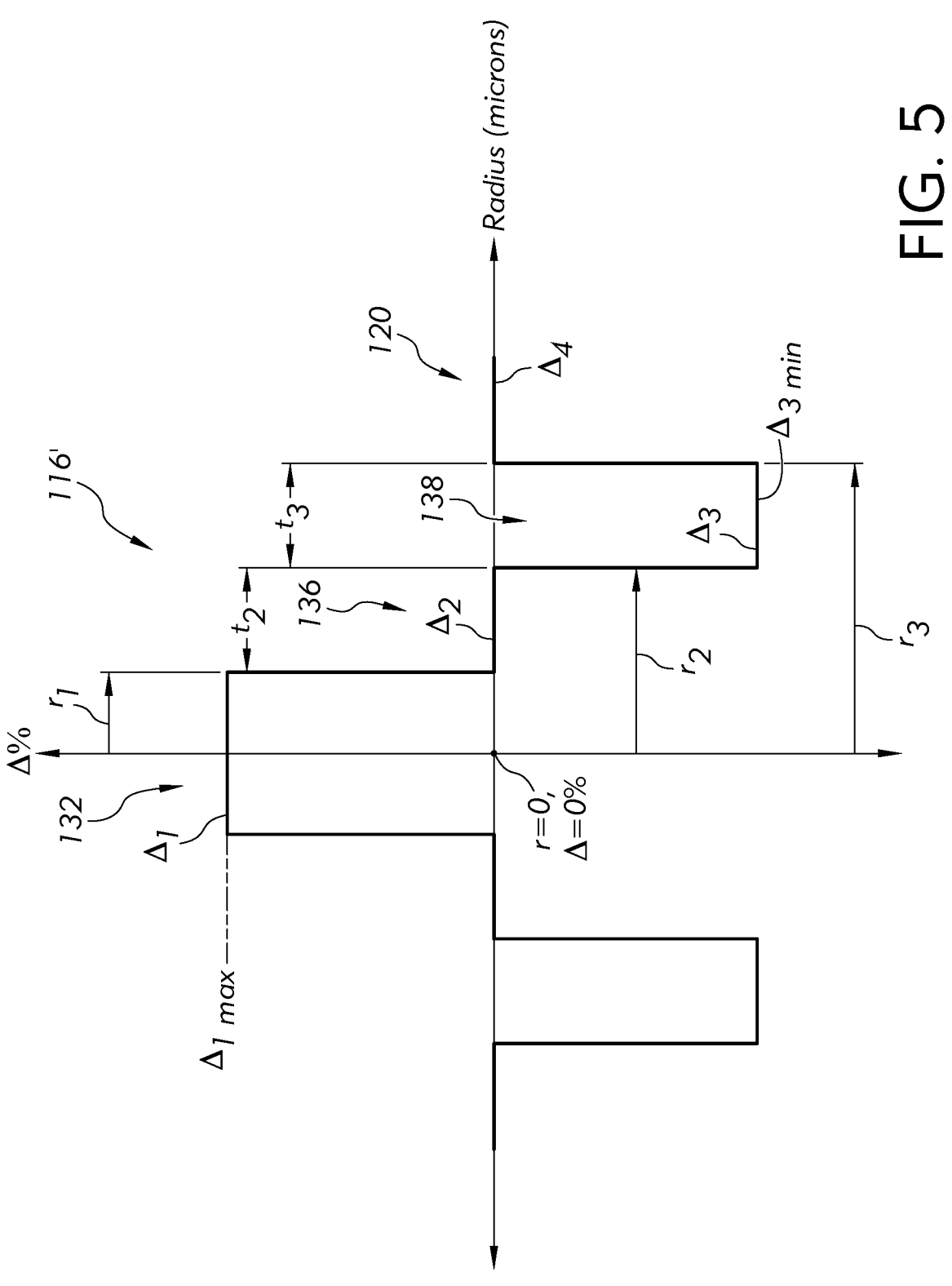
FIG. 5 graphically depicts the relative refractive index (Δ%) as a function of the radius (r) of a waveguide of an amplifying optical fiber according to one or more embodiments shown and described herein.

Referring now to FIGS. 3 and 5, FIG. 5 graphically depicts a relative refractive index profile of a waveguide 116' disposed in a common cladding 120. The core region 132 of the waveguide comprises silica-based glass up-doped with $GeO_2$, $Er_2O_3$, and $Al_2O_3$. Unlike the waveguide 116 of FIG. 4, both $Er_2O_3$ and $Al_2O_3$ have a uniform distribution throughout the core region 132 in the waveguide 116' depicted in FIG. 5. The concentration of dopants in the core region 132 results in a step-index profile (i.e., with a core alpha value greater than 10). The core region 132 has a core relative refractive index $\Delta_1$ and a maximum core relative refractive index $\Delta_{1max}$. In this example, $\Delta_1 = \Delta_{1max}$ throughout the core region 132.

Still referring to FIG. 5, the inner cladding region 136 of the waveguide 116' surrounds the core region 132 and comprises un-doped silica glass with an inner cladding relative refractive index $\Delta_2$ equal to 0%. Accordingly, $\Delta_{1max} > \Delta_2$.

The depressed cladding region 138 surrounds the inner cladding region 136 and comprises silica-based glass down-doped with fluorine. The down-doping of the glass creates a rectangular relative refractive index profile (also referred to herein as a rectangular "trench") with a depressed relative refractive index $\Delta_3$ and a minimum depressed relative refractive index $\Delta_{3min}$. In this embodiment, $\Delta_3 = \Delta_{3min}$ throughout the depressed cladding region 138 resulting in the rectangular shape of the relative refractive index profile. In this, example, $\Delta_{1max} > \Delta_2 > \Delta_{3min}$.

Referring now to FIGS. 3 and 6, FIG. 6 graphically depicts a relative refractive index profile of a waveguide 116" disposed in a common cladding 120. The core region 132 of the waveguide comprises silica-based glass up-doped with $GeO_2$, $Er_2O_3$, and $Al_2O_3$. Like the waveguide 116' of FIG. 5, both $Er_2O_3$ and $Al_2O_3$ have a uniform distribution throughout the core region 132 in the waveguide 116" depicted in FIG. 6. The concentration of dopants in the core region 132 results in a step-index profile (i.e., with a core alpha value greater than 10). The core region 132 has a core relative refractive index $\Delta_1$ and a maximum core relative refractive index $\Delta_{1max}$. In this example, $\Delta_1 = \Delta_{1max}$ throughout the core region 132.

Still referring to FIG. 6, the inner cladding region 136 of the waveguide 116" surrounds the core region 132 and comprises un-doped silica glass with an inner cladding relative refractive index $\Delta_2$ equal to 0%. Accordingly, $\Delta_{1max} > \Delta_2$.

The depressed cladding region 138 surrounds the inner cladding region 136 and comprises silica-based glass down-doped with fluorine. In this example, the concentration of fluorine increases with increasing distance from the longitudinal centerline 126 of the waveguide 116" resulting in a triangular relative refractive index profile with a depressed relative refractive index $\Delta_3$ that decreases to the minimum depressed relative refractive index $\Delta_{3min}$ with increasing distance from the longitudinal centerline 126 of the waveguide 116". In this, example, $\Delta_{1max} > \Delta_2 > \Delta_{3min}$.

Figure 7:
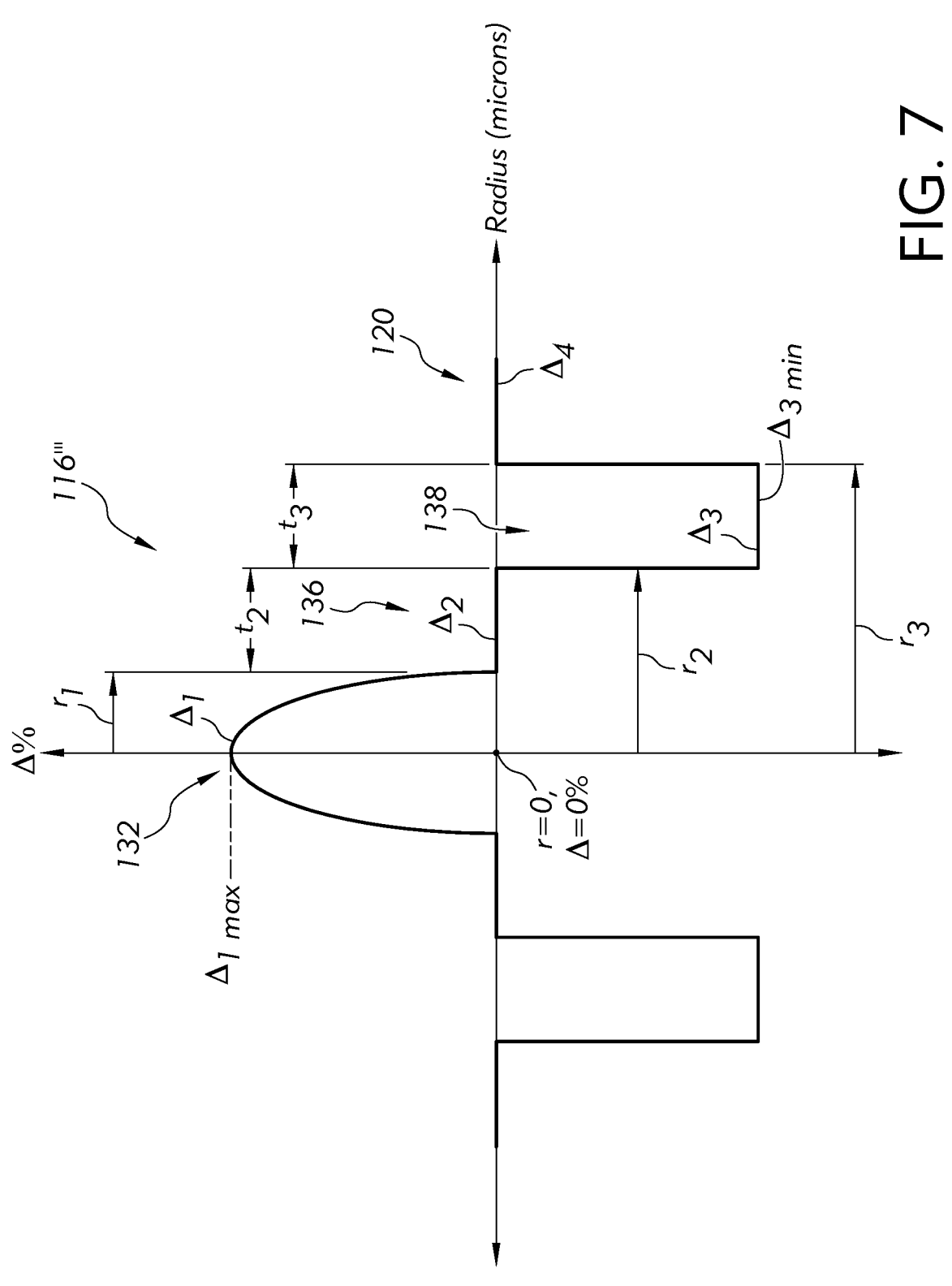
FIG. 7 graphically depicts the relative refractive index (Δ%) as a function of the radius (r) of a waveguide of an amplifying optical fiber according to one or more embodiments shown and described herein.

Referring now to FIGS. 3 and 7, FIG. 7 graphically depicts a relative refractive index profile of a waveguide 116"' disposed in a common cladding 120. The core region 132 of the waveguide comprises silica-based glass up-doped with $GeO_2$, $Er_2O_3$, and $Al_2O_3$. In this example, the concentration of $GeO_2$ is graded in the core region 132 such that the concentration of $GeO_2$ is a maximum at or near the longitudinal centerline 126 of the waveguide 116"' and decreases with increasing distance from the longitudinal centerline 126. In this example, both $Er_2O_3$ and $Al_2O_3$ have a uniform distribution throughout the core region 132 of the waveguide 116"' depicted in FIG. 7. The concentration of dopants in the core region 132 results in a graded-index profile (i.e., with a core alpha value less than 10). The core region 132 has a core relative refractive index $\Delta_1$ and a maximum core relative refractive index $\Delta_{1max}$. In this example, $\Delta_1 = \Delta_{1max}$ at or near the longitudinal centerline 126 of the core region 132 and decreases with increasing distance from the longitudinal centerline 126 of the core region 132.

Still referring to FIG. 7, the inner cladding region 136 of the waveguide 116"' surrounds the core region 132 and comprises un-doped silica glass with an inner cladding relative refractive index $\Delta_2$ equal to 0%. Accordingly, $\Delta_{1max} > \Delta_2$.

The depressed cladding region 138 surrounds the inner cladding region 136 and comprises silica-based glass down-doped with fluorine. The down-doping of the glass creates a rectangular relative refractive index profile (also referred to herein as a rectangular "trench") with a depressed relative refractive index $\Delta_3$ and a minimum depressed relative refractive index $\Delta_{3min}$. In this embodiment, $\Delta_3 = \Delta_{3min}$ throughout the depressed cladding region 138 resulting in the rectangular shape of the relative refractive index profile. In this, example, $\Delta_{1max} > \Delta_2 > \Delta_{3min}$.

While FIGS. 4-7 depict specific examples of relative refractive index profiles for the waveguides of amplifying optical fibers described herein, it should be understood that other relative refractive index profiles are contemplated and possible. For example, the core regions of FIGS. 4 and 7 may be used in combination a depressed index cladding having either a rectangular relative refractive index profile or a triangular relative refractive index profile.

Tables 1-3 below contain modeled physical and optical properties for waveguides having the relative refractive index profiles graphically depicted in FIGS. 4-7. In each of these examples, the waveguide was modeled with a core region up-doped with $GeO_2$, $Er_2O_3$, and $Al_2O_3$ such that the core region had either a step-index or graded index profile, an inner cladding region formed from un-doped silica such that the inner cladding relative refractive index $\Delta_2$ was 0%, and a common cladding region formed from un-doped silica such that the common cladding relative refractive index $\Delta_4$ was 0%. The parameters of the core region and depressed cladding region (i.e., radius, index of refraction, etc.) and the radius of the inner cladding region were varied and the Mode Field Diameter (MFD), cable cutoff wavelength, inter-waveguide crosstalk, numerical aperture and peak power conversion efficiency were determined.

In particular, Examples 1-8 in Tables 1-2 were modeled with relative refractive index profiles as depicted in FIG. 5 such that the core region 132 had a step-index profile (core alpha value greater than 10) and the depressed cladding region 138 had a rectangular relative refractive index profile.

TABLE 1

|  | Ex. 1 | Ex. 2 | Ex. 3 | Ex. 4 | Ex. 5 |
|---|---|---|---|---|---|
| $\Delta_{1max}$ (%) | 1 | 1.1 | 1 | 1.2 | 1 |
| $r_1$ ($\mu$m) | 2 | 1.9 | 3 | 2.8 | 1.8 |
| Core Alpha Value | 12 | 12 | 12 | 12 | 12 |
| $Er_2O_3$ concentration in core region (ppm) | 500–7500 | 500–7500 | 500–7500 | 500–7500 | 500–7500 |
| $Al_2O_3$ concentration in core region (wt %) | >1 wt % | >1 wt % | >1 wt % | >1 wt % | >1 wt % |
| $\Delta_2$ (%) | 0 | 0 | 0 | 0 | 0 |
| $r_2$ ($\mu$m) | 10 | 10 | 10 | 10 | 9 |
| $\Delta_{3min}$ (%) | −0.3 | −0.3 | −0.3 | −0.3 | −0.45 |
| $r_3$ ($\mu$m) | 12.91 | 12.91 | 12.91 | 12.91 | 14.26 |
| $V_T$ (% $\Delta$ micron$^2$) | 20 | 20 | 20 | 20 | 55 |
| Trench Shape | Rectangular | Rectangular | Rectangular | Rectangular | Rectangular |
| MFD at 1550 nm ($\mu$m) | 6.18 | 5.9 | 6.21 | 5.7 | 6.44 |
| Cable Cutoff (nm) | 882 | 880 | 1357 | 1343 | 883 |
| NA | 0.206 | 0.216 | 0.206 | 0.226 | 0.206 |
| Peak Power Conversion Efficiency @ 50 m length (%) | >50% | >50% | >75% | >75% | >50% |
| Inter-waveguide crosstalk (dB) at 1550 nm for 40 micron waveguide spacing for 50 m length and bend radius of 70 mm | −100.12 | −106.71 | −142.76 | −164.71 | −100.57 |
| Inter-waveguide crosstalk (dB) at 1550 nm for 30 micron waveguide spacing for 50 m length and bend radius of 70 mm | −57.92 | −62.64 | −86.12 | −101.48 | −63.26 |
| Inter-waveguide crosstalk (dB) at 1550 nm for 25 micron waveguide spacing for 50 m length and bend radius of 70 mm | −36.49 | −40.28 | −57.47 | −69.81 | −44.29 |

Examples 9 and 10 in Table 2 were modeled with relative refractive index profiles as depicted in FIG. 6 such that the core region 132 had a step-index profile (core alpha value greater than 10) and the depressed cladding region 138 had a triangular relative refractive index profile.

TABLE 2

|  | Ex. 6 | Ex. 7 | Ex. 8 | Ex. 9 | Ex. 10 |
|---|---|---|---|---|---|
| $\Delta_{1max}$ (%) | 1.2 | 1 | 1.2 | 1 | 1 |
| $r_1$ ($\mu$m) | 1.6 | 3 | 2.8 | 1.86 | 3.83 |
| Core Alpha Value | 12 | 12 | 12 | 12 | 12 |
| $Er_2O_3$ concentration in core region | 500–7500 | 500–7500 | 500–7500 | 500–7500 | 500–7500 |

TABLE 2-continued

|  | Ex. 6 | Ex. 7 | Ex. 8 | Ex. 9 | Ex. 10 |
|---|---|---|---|---|---|
| (ppm) | | | | | |
| $Al_2O_3$ concentration in core region (wt %) | >1 wt % | >1 wt % | >1 wt % | >1 wt % | >1 wt % |
| $\Delta_2$ (%) | 0 | 0 | 0 | 0 | 0 |
| $r_2$ (µm) | 9 | 9 | 9 | 7.5 | 7.5 |
| $\Delta_{3min}$ (%) | −0.45 | −0.45 | −0.45 | −0.5 | −0.5 |
| $r_3$ (µm) | 14.26 | 14.26 | 14.26 | 14.5 | 14.5 |
| $V_T$ (% $\Delta$ micron$^2$) | 55 | 55 | 55 | 43 | 43 |
| Trench Shape | Rectangular | Rectangular | Rectangular | Triangular | Triangular |
| MFD at 1550 nm (µm) | 5.99 | 6.21 | 5.7 | 6.29 | 6.11 |
| Cable Cutoff (nm) | 863 | 1342 | 1381 | 879 | 1355 |
| NA | 0.226 | 0.206 | 0.226 | 0.206 | 0.206 |
| Peak Power Conversion Efficiency @ 50 m length (%) | >50% | >75% | >75% | >50% | >75% |
| Inter-waveguide crosstalk (dB) at 1550 nm for 40 micron waveguide spacing for 50 m length and bend radius of 70 mm | −107.54 | −154.74 | −175.26 | −98.06 | −162.45 |
| Inter-waveguide crosstalk (dB) at 1550 nm for 30 micron waveguide spacing for 50 m length and bend radius of 70 mm | −68.12 | −98.14 | −112.6 | −59.16 | −99.57 |
| Inter-waveguide crosstalk (dB) at 1550 nm for 25 spacing for 50 m length and bend radius of 70 mm | −48.10 | −69.52 | −80.95 | −39.4 | −67.81 |

Examples 11 and 12 in Table 3 were modeled with relative refractive index profiles as depicted in FIG. 7 such that the core region 132 had a graded-index profile (core alpha value less than 10) and the depressed cladding region 138 had a rectangular relative refractive index profile.

TABLE 3

|  | Ex. 11 | Ex. 12 |
|---|---|---|
| $\Delta_{1max}$ (%) | 1.2 | 1.2 |
| $r_1$ (µm) | 2.25 | 3.5 |
| Core Alpha Value | 2 | 2 |
| $Er_2O_3$ concentration in core region (ppm) | 500-7500 | 500-7500 |
| $Al_2O_3$ concentration in core region (wt %) | >1 wt % | >1 wt % |
| $\Delta_2$ (%) | 0 | 0 |
| $r_2$ (µm) | 9 | 9 |
| $\Delta_{3min}$ (%) | −0.45 | −0.45 |
| $r_3$ (µm) | 14.26 | 14.26 |
| $V_T$ (% $\Delta$ micron$^2$) | 55 | 55 |
| Trench Shape | Rectangular | Rectangular |
| MFD at 1550 nm (µm) | 6.38 | 6.1 |
| Cable Cutoff (nm) | 897 | 1364 |
| NA | 0.226 | 0.226 |
| Peak Power Conversion Efficiency @ 50 m length (%) | >50% | >75% |
| Inter-waveguide crosstalk (dB) at 1550 nm for 40 micron waveguide spacing for 50 m | −106.1 | −66 |

TABLE 3-continued

|  | Ex. 11 | Ex. 12 |
|---|---|---|
| length and bend radius of 70 mm | | |
| Inter-waveguide crosstalk (dB) at 1550 nm for 30 micron waveguide spacing for 50 m length and bend radius of 70 mm | −150.4 | −96.2 |
| Inter-waveguide crosstalk (dB) at 1550 nm for 25 micron waveguide spacing for 50 m length and bend radius of 70 mm | −47.3 | −68.4 |

The data in Tables 1-3 demonstrate that the inter-waveguide crosstalk and peak power conversion efficiency may be influenced by the radius of the core region, the trench volume, and trench shape even for relatively short lengths (i.e., 50 m) of the optical fiber. However, by utilizing a depressed cladding region with a sufficiently large trench volume (i.e., greater than or equal to 10% µm$^2$ and less than or equal to 60% µm$^2$), the inter-waveguide crosstalk between a waveguide and its nearest neighbor waveguide can be maintained at a sufficiently low level (i.e., less than or equal to −30 db) even as the waveguide-to-waveguide spacing decreases while also maintaining good peak power conversion efficiency (i.e., greater than 50%) for optical fibers with different waveguide configurations, numerical apertures, mode field diameters, and the like.

It is also noted that the inter-waveguide crosstalk scales as a function of the mode coupling coefficient between nearest neighbor waveguides. In particular, the inter-waveguide crosstalk scales a function of $10 * \log 10(CC^2)$ where "CC" is the mode coupling coefficient between nearest neighbor waveguides. As the mode coupling coefficient between nearest neighbor waveguides increases, the inter-core waveguide crosstalk increases (i.e., becomes less negative).

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An amplifying optical fiber comprising:
a common cladding comprising a radius defining a glass portion of the amplifying optical fiber and having a relative refractive index $delta_4$; and
at least one waveguide extending through the common cladding, the at least one waveguide comprising a core region, an inner cladding region encircling and directly contacting the core region, and a depressed cladding region encircling and directly contacting the inner cladding region, wherein:
the core region comprises from greater than or equal to about 500 ppm and less than or equal to about 10,000 ppm $Er_2O_3$ and a core maximum relative refractive index $delta_{1max}$;
the inner cladding region comprises an inner cladding relative refractive index $delta_2$;
the depressed cladding region comprises a minimum depressed relative refractive index $delta_{3min}$; and
$\Delta_{1max} > \Delta_2 > \Delta_{3min}$ and $\Delta_4 > _{3min}$;
wherein the core region comprises greater than or equal to 1 wt.% and less than or equal to 20 wt.% $Al_2O_3$.

2. The amplifying optical fiber of claim 1, wherein the core region comprises greater than or equal to 8.0 wt. % and less than or equal to 36 wt. % $GeO_2$.

3. The amplifying optical fiber of claim 1, wherein the $Er_2O_3$ is uniformly distributed in the core region.

4. The amplifying optical fiber of claim 3, wherein:
the core region comprises greater than or equal to 1 wt. % and less than or equal to 20 wt. % $Al_2O_3$; and
the $Al_2O_3$ has a uniform distribution in the core region.

5. The amplifying optical fiber of claim 1, wherein the $Er_2O_3$ has a graded distribution in the core region such that the $Er_2O_3$ is a maximum at or near a longitudinal centerline of the core region and decreases with increasing distance from the longitudinal centerline of the core region.

6. The amplifying optical fiber of claim 5, wherein:
the core region comprises greater than or equal to 1 wt. % and less than or equal to 20 wt. % $Al_2O_3$; and
the $Al_2O_3$ has a graded distribution in the core region such that the $Al_2O_3$ is a maximum at or near the longitudinal centerline of the core region and decreases with increasing distance from the longitudinal centerline of the core region.

7. The amplifying optical fiber of claim 1, wherein the depressed cladding region has a trench volume $V_T$ greater than or equal to 10% $\mu m^2$ and less than or equal to 60% $\mu m^2$.

8. The amplifying optical fiber of claim 1, wherein the depressed cladding region comprises a maximum fluorine concentration of greater than or equal to 0.5 wt. % and less than or equal to 2.5 wt. %.

9. The amplifying optical fiber of claim 1, wherein a depressed relative refractive index $\Delta_3(r)$ of the depressed cladding region decreases with increasing radial distance from a longitudinal centerline of the at least one waveguide to the minimum depressed relative refractive index $\Delta_{3min}$.

10. The amplifying optical fiber of claim 1, wherein a peak power conversion efficiency of the at least one waveguide is greater than or equal to 50%.

11. The amplifying optical fiber of claim 1, wherein a numerical aperture of the at least one waveguide is greater than or equal to 0.15 and less than or equal to 0.3.

12. The amplifying optical fiber of claim 1, wherein a cable cutoff wavelength of the at least one waveguide is less than or equal to 1500 nm.

13. The amplifying optical fiber of claim 1, wherein the at least one waveguide comprises a plurality of waveguides.

14. The amplifying optical fiber of claim 13, wherein an inter-waveguide crosstalk between each waveguide of the plurality of waveguides and a nearest neighbor of each waveguide is less than or equal to −30 dB as measured for a 50 m length of the amplifying optical fiber with a bend radius of less than or equal to 70 mm operating at a wavelength of 1550 nm.

15. The amplifying optical fiber of claim 13, wherein a waveguide-to-waveguide spacing between each waveguide of the plurality of waveguides and a nearest neighbor of each waveguide is greater than or equal to 25 μm.

16. An amplifying optical fiber comprising:
a common cladding comprising a radius defining a glass portion of the amplifying optical fiber and having a relative refractive index $delta_4$; and
a plurality of waveguides extending through the common cladding, each waveguide of the plurality of waveguides comprising a core region, an inner cladding region encircling and directly contacting the core region, and a depressed cladding region encircling and directly contacting the inner cladding region, wherein:
the core region of each waveguide comprises from greater than or equal to about 500 ppm and less than or equal to about 10,000 ppm $Er_2O_3$ and a core maximum relative refractive index $delta_{1max}$;
the inner cladding region of each waveguide comprises an inner cladding relative refractive index $delta\Delta_2$;
the depressed cladding region of each waveguide comprises a minimum depressed relative refractive index $A_{3min}$ and a trench volume $V_T$ greater than or equal to 10% $\mu m^2$ and less than or equal to 60% $\mu m^2$;
$\Delta_{1max} > \Delta_2 > \Delta_{3min}$ and $\Delta_4 > _{3min}$; and
an inter-waveguide crosstalk between each waveguide of the plurality of waveguides and a nearest neighbor of each waveguide is less than or equal to −30 dB as measured for a 50 m length of the amplifying optical fiber comprising a bend radius of less than or equal to 70 mm operating at a wavelength of 1550 nm;
wherein the core region of each waveguide comprises greater than or equal to 1 wt.% and less than or equal to 20 wt.% $Al_2O_3$.

17. The amplifying optical fiber of claim 16, wherein the core region of each waveguide comprises greater than or equal to 6.0 wt. % and less than or equal to 22 wt. % $GeO_2$.

18. The amplifying optical fiber of claim 16, wherein each waveguide comprises the same relative refractive index profile.

\* \* \* \* \*